US012568438B2

(12) United States Patent
Esswie

(10) Patent No.: US 12,568,438 B2
(45) Date of Patent: Mar. 3, 2026

(54) IDLE MODE NETWORK POWER SAVING

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 382 days.

(21) Appl. No.: 18/166,194

(22) Filed: Feb. 8, 2023

(65) Prior Publication Data

US 2024/0267847 A1 Aug. 8, 2024

(51) Int. Cl.
| | |
|---|---|
| *H04W 76/00* | (2018.01) |
| *H04W 52/02* | (2009.01) |
| *H04W 56/00* | (2009.01) |
| *H04W 76/10* | (2018.01) |
| *H04W 76/20* | (2018.01) |
| *H04B 17/318* | (2015.01) |

(52) U.S. Cl.
CPC ..... *H04W 52/0235* (2013.01); *H04W 56/001* (2013.01); *H04W 76/10* (2018.02); *H04W 76/20* (2018.02); *H04B 17/318* (2015.01)

(58) Field of Classification Search
CPC ........... H04W 52/0235; H04W 56/001; H04W 76/10; H04W 76/20; H04W 52/0206; H04B 17/318; Y02D 30/70
See application file for complete search history.

(56) References Cited

U.S. PATENT DOCUMENTS

| | | | |
|---|---|---|---|
| 2020/0029275 A1* | 1/2020 | Mackenzie | H04W 52/0206 |
| 2023/0043517 A1* | 2/2023 | Höglund | H04W 74/0841 |

OTHER PUBLICATIONS

Huawei (Huawei: "Network energy saving techniques", 3GPP Draft; R3-225670, Sep. 28, 2022).*
Technical specifications (TS) 38.201—"5G; NR; Physical layer; General description", 3GPP TS 38.201 version 15.0.0 Release 15, Sep. 2018, 14 pages.
Technical specifications (TS) 38.331—"5G; NR; Radio Resource Control (RRC); Protocol specification", 3GPP TS 38.331 version 16.1.0 Release 16, Jul. 2020, 886 pages.

(Continued)

*Primary Examiner* — Lakeram Jangbahadur
(74) *Attorney, Agent, or Firm* — Amin, Turocy & Watson, LLP

(57) ABSTRACT
Radio access nodes may receive from a core network a configuration comprising a criterion to be used to determined to activate a network energy saving mode. The nodes share network energy saving information. A node activates a network energy saving mode upon the criterion being satisfied. A user equipment may establish a connection with a node that has not activated a network energy saving mode via a provisioning beam. Based on the connection being established via the provisioning beam, the node that has not activated a network energy saving mode may request that the node that activated the network energy saving mode transmit a synchronization signal block signal and that the user equipment monitor the synchronization signal block signal and determine whether to establish a connection with the node that is operating in an active network energy saving mode based on a signal strength of the synchronization signal block signal.

20 Claims, 14 Drawing Sheets

(56) References Cited

OTHER PUBLICATIONS

Technical specifications (TS) 38.211—"5G; NR; Physical channels and modulation", 3GPP TS 38.211 version 16.2.0 Release 16, Jul. 2020, 136 pages.

Technical specifications (TS) 38.304—"5G; NR; User Equipment (UE) procedures in idle mode and in RRC Inactive state", 3GPP TS 38.304 version 16.1.0 Release 16, Jul. 2020, 41 pages.

Technical specifications (TS) 38.300—"5G; NR; NR and NG-RAN Overall description; Stage-2" 3GPP TS 38.300 version 16.4.0 Release 16, Jan. 2021, 151 pages.

International Search Report and Written Opinion mailed Mar. 11, 2024 for PCT Application No. PCT/US2023/035961, 14 pages.

Huawei: "Network energy saving techniques", 3GPP Draft; R3-225670, RAN WG3, No. E-meeting; Oct. 10, 2022-Oct. 20, 2022 Sep. 28, 2022 (Sep. 28, 2022), XP052265810, [https://ftp.3gpp.org/tsg_ran/WG3_Iu/TS GR3_117bis-e/Docs/R3-225670.zip R3-225670.docx] 10 pages.

Notification Concerning Transmittal of International Preliminary Report on Patentability mailed Aug. 21, 2025 for PCT Application No. PCT/US2023/035961, 8 pages.

European Office Action mailed Sep. 16, 2025 for European Patent Application No. 23805766.5, 3 pages.

* cited by examiner

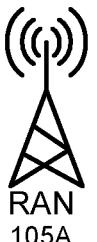

RAN
105A

RAN
105B

Receive idle mode network energy saving configurations from core network, over backhaul links, that may include a maximum threshold number of idle-mode-to-connected-mode transitions or an associated rolling period of time in terms of ms, frames, slots, etc.

405

Monitor and determine number of idle mode UE devices transitioned from idle/inactive mode to connected mode during each configured rolling period of time

410

On condition of a number of devices, having transitioned from idle to connected mode during the determined rolling period of time, that is lower than the configured threshold, suspend connecting of idle-mode UE devices and suspend transmitting of synchronization signal block (SSBs) and or system information block 1 (SIB1) messages

415

Transmit a NES configuration update (e.g. 1300 shown in FIG. 13) via, for example, XN/backhaul links, towards adjacent/assisting RAN nodes, indicating one or more of the following information elements: a combination of barred idle-mode transmissions during the active NES period (e.g., ([SSB], [SSB, SIB1], or [SIB1]), an active period of NES mode, or SIB1 contents of RAN 105B, in case RAN 105B will not be transmitting SIB1 information during NES time.

420

Active NES
setup
configurations

FIG. 6

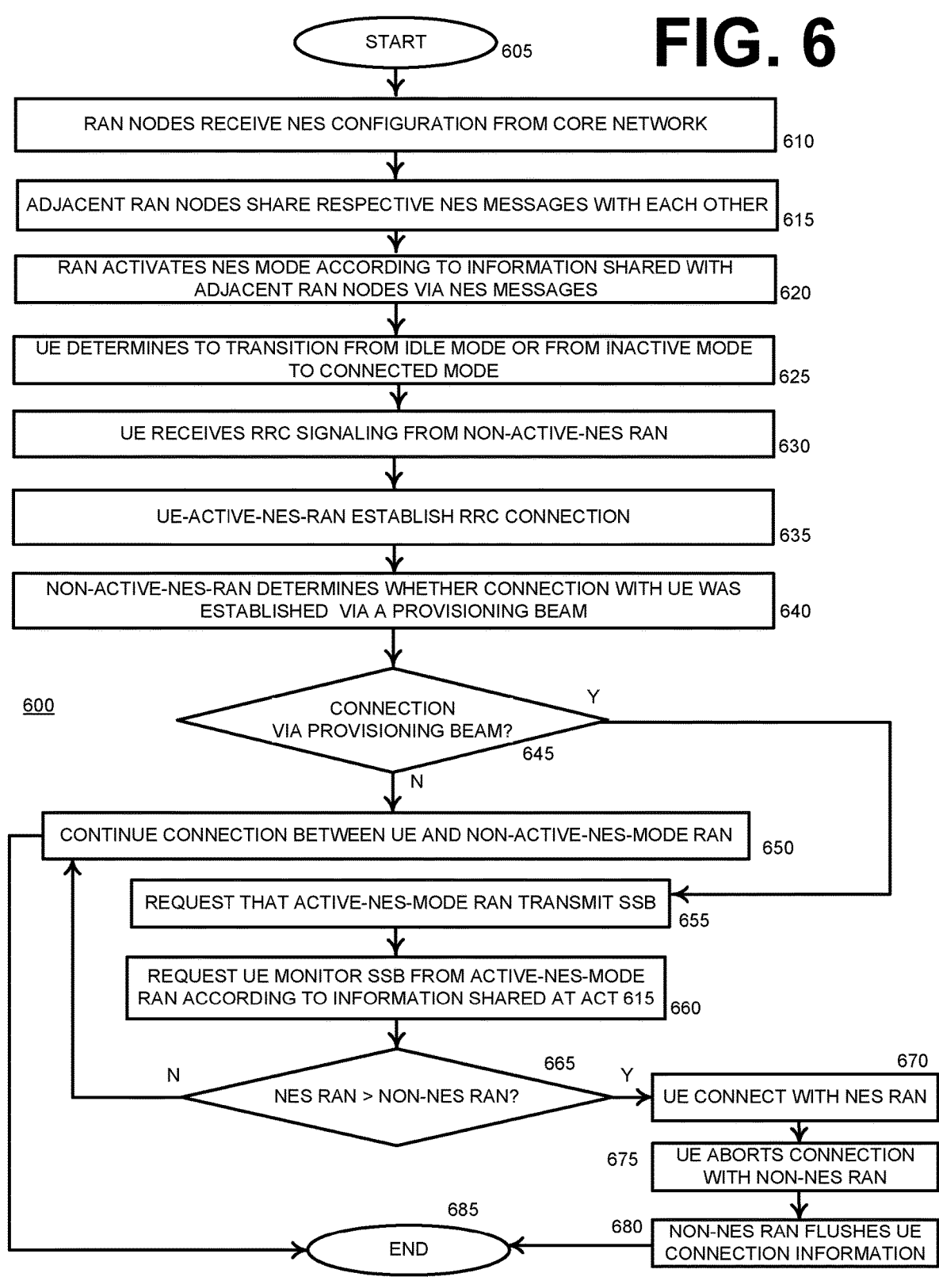

START 605

RAN NODES RECEIVE NES CONFIGURATION FROM CORE NETWORK 610

ADJACENT RAN NODES SHARE RESPECTIVE NES MESSAGES WITH EACH OTHER 615

RAN ACTIVATES NES MODE ACCORDING TO INFORMATION SHARED WITH ADJACENT RAN NODES VIA NES MESSAGES 620

UE DETERMINES TO TRANSITION FROM IDLE MODE OR FROM INACTIVE MODE TO CONNECTED MODE 625

UE RECEIVES RRC SIGNALING FROM NON-ACTIVE-NES RAN 630

UE-ACTIVE-NES-RAN ESTABLISH RRC CONNECTION 635

NON-ACTIVE-NES-RAN DETERMINES WHETHER CONNECTION WITH UE WAS ESTABLISHED VIA A PROVISIONING BEAM 640

600

CONNECTION VIA PROVISIONING BEAM? 645    Y

N

CONTINUE CONNECTION BETWEEN UE AND NON-ACTIVE-NES-MODE RAN 650

REQUEST THAT ACTIVE-NES-MODE RAN TRANSMIT SSB 655

REQUEST UE MONITOR SSB FROM ACTIVE-NES-MODE RAN ACCORDING TO INFORMATION SHARED AT ACT 615 660

665    Y

N    NES RAN > NON-NES RAN?

670

UE CONNECT WITH NES RAN

675    UE ABORTS CONNECTION WITH NON-NES RAN

685

680    NON-NES RAN FLUSHES UE CONNECTION INFORMATION

END

FIG. 7

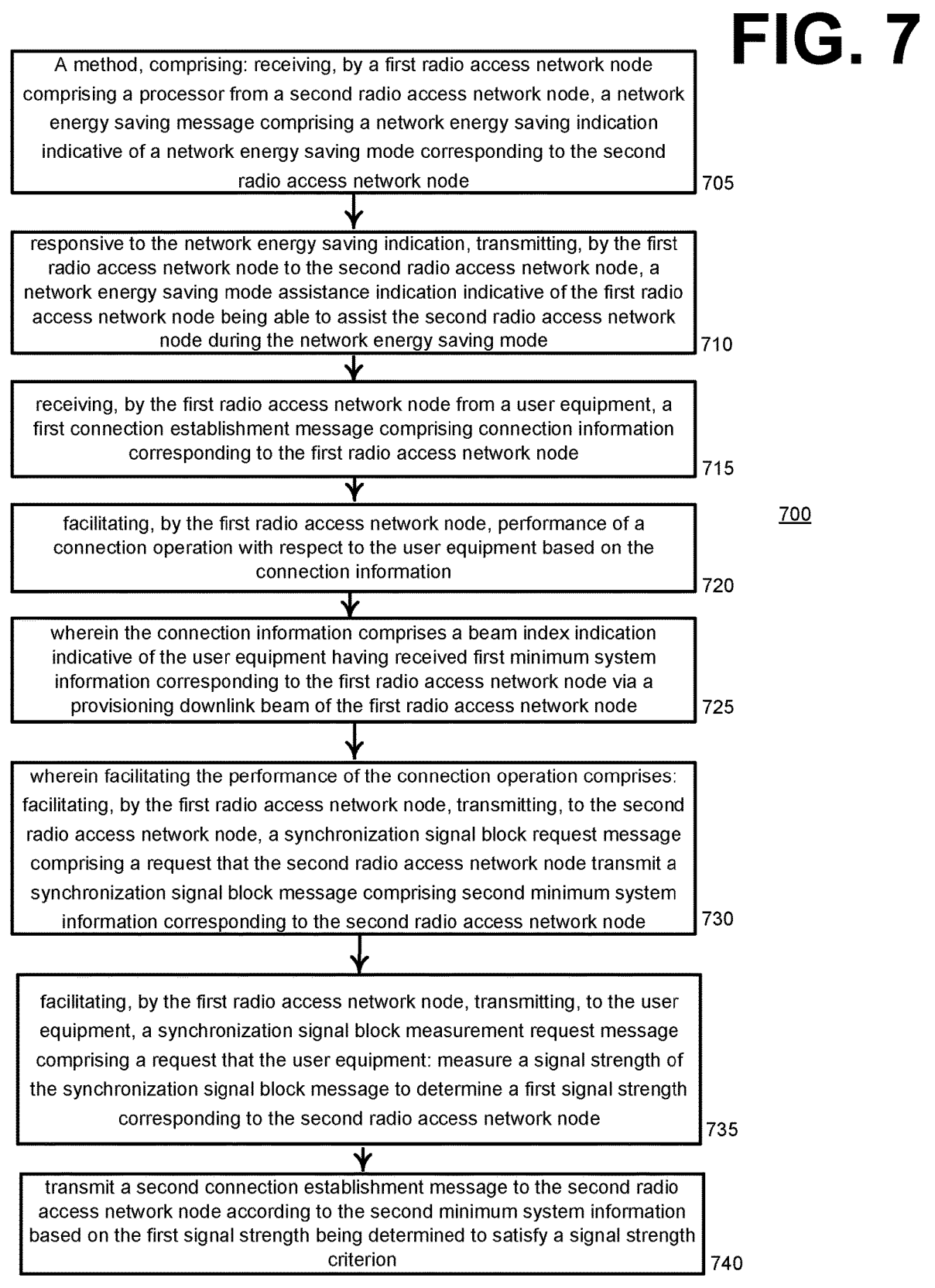

A method, comprising: receiving, by a first radio access network node comprising a processor from a second radio access network node, a network energy saving message comprising a network energy saving indication indicative of a network energy saving mode corresponding to the second radio access network node

705

↓ responsive to the network energy saving indication, transmitting, by the first radio access network node to the second radio access network node, a network energy saving mode assistance indication indicative of the first radio access network node being able to assist the second radio access network node during the network energy saving mode

710

↓ receiving, by the first radio access network node from a user equipment, a first connection establishment message comprising connection information corresponding to the first radio access network node

715

↓ facilitating, by the first radio access network node, performance of a connection operation with respect to the user equipment based on the connection information

720

700

↓ wherein the connection information comprises a beam index indication indicative of the user equipment having received first minimum system information corresponding to the first radio access network node via a provisioning downlink beam of the first radio access network node

725

↓ wherein facilitating the performance of the connection operation comprises: facilitating, by the first radio access network node, transmitting, to the second radio access network node, a synchronization signal block request message comprising a request that the second radio access network node transmit a synchronization signal block message comprising second minimum system information corresponding to the second radio access network node

730

↓ facilitating, by the first radio access network node, transmitting, to the user equipment, a synchronization signal block measurement request message comprising a request that the user equipment: measure a signal strength of the synchronization signal block message to determine a first signal strength corresponding to the second radio access network node

735

↓ transmit a second connection establishment message to the second radio access network node according to the second minimum system information based on the first signal strength being determined to satisfy a signal strength criterion

Figure 8:
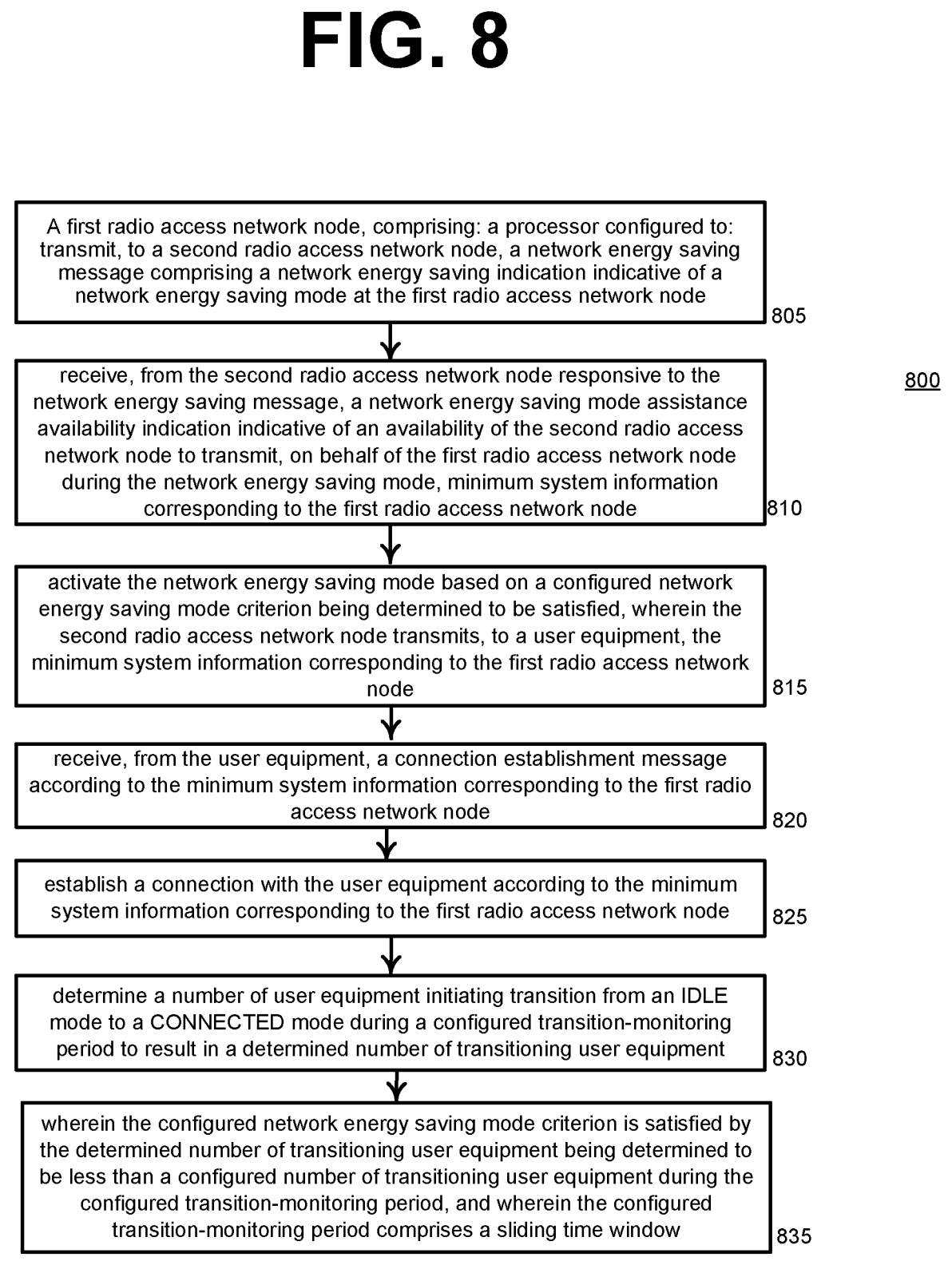

A first radio access network node, comprising: a processor configured to: transmit, to a second radio access network node, a network energy saving message comprising a network energy saving indication indicative of a network energy saving mode at the first radio access network node
805

↓ receive, from the second radio access network node responsive to the network energy saving message, a network energy saving mode assistance availability indication indicative of an availability of the second radio access network node to transmit, on behalf of the first radio access network node during the network energy saving mode, minimum system information corresponding to the first radio access network node
810

↓ activate the network energy saving mode based on a configured network energy saving mode criterion being determined to be satisfied, wherein the second radio access network node transmits, to a user equipment, the minimum system information corresponding to the first radio access network node
815

↓ receive, from the user equipment, a connection establishment message according to the minimum system information corresponding to the first radio access network node
820

↓ establish a connection with the user equipment according to the minimum system information corresponding to the first radio access network node
825

↓ determine a number of user equipment initiating transition from an IDLE mode to a CONNECTED mode during a configured transition-monitoring period to result in a determined number of transitioning user equipment
830

↓ wherein the configured network energy saving mode criterion is satisfied by the determined number of transitioning user equipment being determined to be less than a configured number of transitioning user equipment during the configured transition-monitoring period, and wherein the configured transition-monitoring period comprises a sliding time window
835

Figure 9:
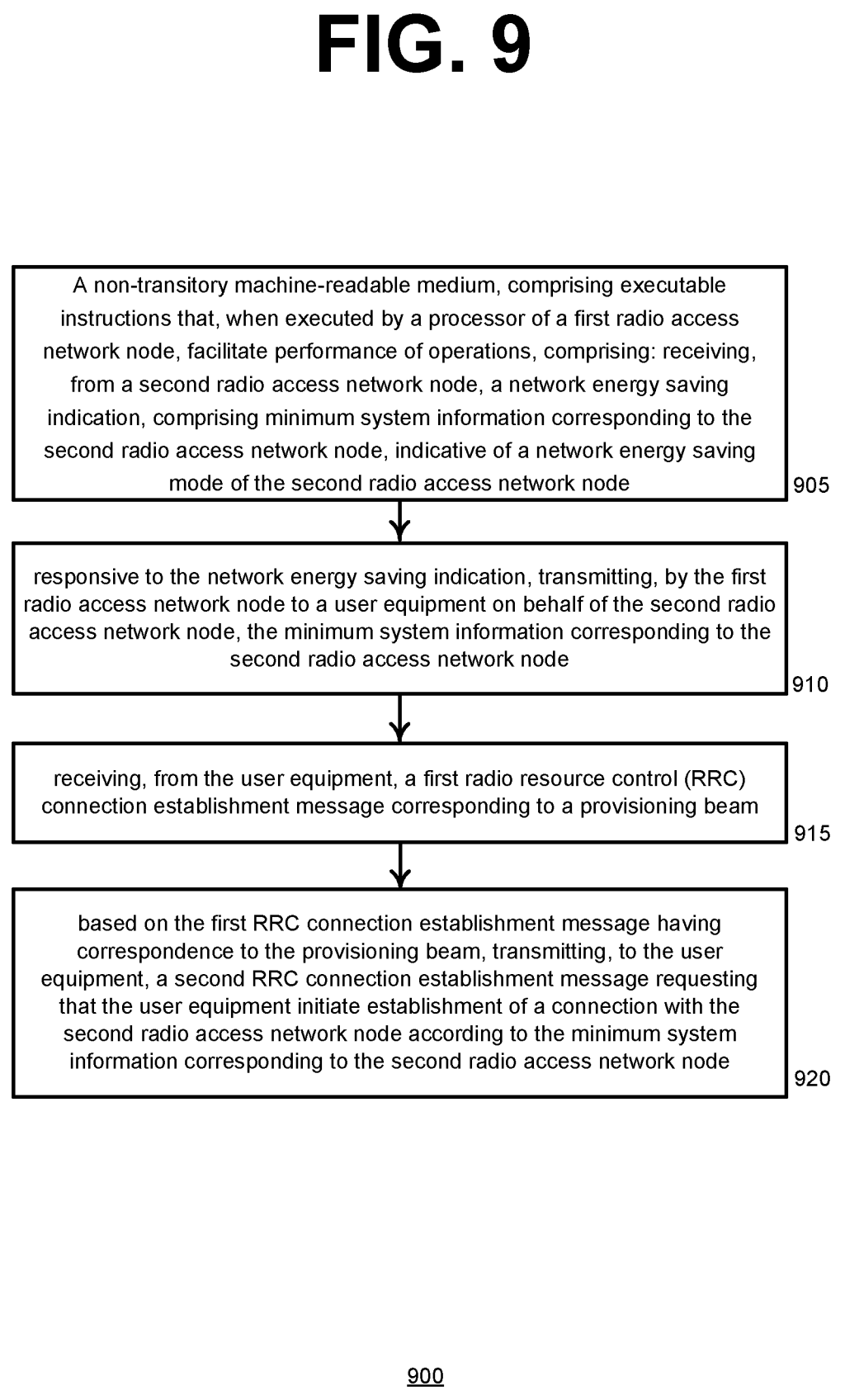

A non-transitory machine-readable medium, comprising executable instructions that, when executed by a processor of a first radio access network node, facilitate performance of operations, comprising: receiving, from a second radio access network node, a network energy saving indication, comprising minimum system information corresponding to the second radio access network node, indicative of a network energy saving mode of the second radio access network node ⌐905

↓ responsive to the network energy saving indication, transmitting, by the first radio access network node to a user equipment on behalf of the second radio access network node, the minimum system information corresponding to the second radio access network node ⌐910

↓ receiving, from the user equipment, a first radio resource control (RRC) connection establishment message corresponding to a provisioning beam ⌐915

↓ based on the first RRC connection establishment message having correspondence to the provisioning beam, transmitting, to the user equipment, a second RRC connection establishment message requesting that the user equipment initiate establishment of a connection with the second radio access network node according to the minimum system information corresponding to the second radio access network node ⌐920

900

Idle mode NES configurations from core network to RAN nodes via
backhaul links

Idle mode network energy saving (NES) configurations

- Maximum threshold of number of idle-to-connected mode
  transitioning devices for idle mode NES activation
- Rolling period of idle mode NES threshold provisioning in
  terms of ms, frames, slots, or aggregated frames

Active NES setup over XN/backhaul links

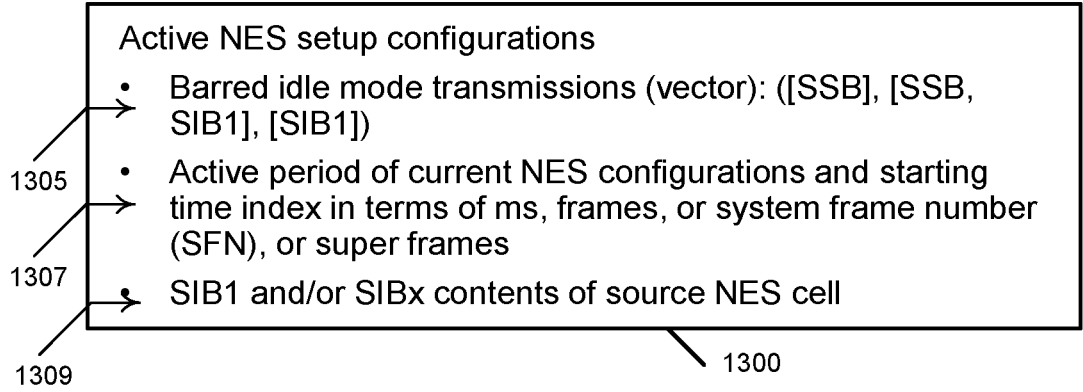

Active NES setup configurations

- Barred idle mode transmissions (vector): ([SSB], [SSB,
  SIB1], [SIB1])
- Active period of current NES configurations and starting
  time index in terms of ms, frames, or system frame number
  (SFN), or super frames
- SIB1 and/or SIBx contents of source NES cell

IDLE MODE NETWORK POWER SAVING

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise receiving, by a first radio access network node comprising a processor from a second radio access network node, a network energy saving message comprising a network energy saving indication indicative of a network energy saving mode corresponding to the second radio access network node. The first radio access network node and second radio access network node may be part of a configured group of radio access network nodes that are adjacent to one another, that are within a configured range of one another, or that provide communication signal coverage to a configured geographic area. The network energy saving message or network energy saving indication may correspond to the second radio access network node having determined to activate a network energy saving mode. The network energy saving message may comprise a configuration, and may comprise elements. The first radio access network node may be a radio access network node that has not determined to activate a network energy saving mode or a radio access network node for which a network energy saving mode is inactive. In an embodiment, the first radio access network node may be a radio access network node that has determined to activate a network energy saving mode, but that can nevertheless assist, or accommodate, transmitting minimum system information on behalf of the second radio access network node while the second radio access network node is in a network energy saving mode corresponding to the network energy saving message.

Responsive to the network energy saving indication, or network energy saving message, the example method may comprise transmitting, by the first radio access network node to the second radio access network node, a network energy saving mode assistance indication indicative of the first radio access network node being able to assist the second radio access network node during the network energy saving mode of the second radio access network node. The example method may comprise receiving, by the first radio access network node from a user equipment, a first connection establishment message comprising connection information corresponding to the first radio access network node. Connection information may comprise minimum system information, such as system information block 1 ("SIB1") information, corresponding to a radio access network node. Connection information may comprise beam information corresponding to a beam, or beam direction, of a radio access network node. The example method may comprise facilitating, by the first radio access network node, performance of a connection operation with respect to the user equipment based on the connection information. The network energy saving message comprises minimum system information corresponding to the second radio access network node.

In an embodiment, the minimum system information corresponding to the second radio access network node comprises information that the second radio access network node transmits in a system information block 1 when the network energy saving mode is inactive at the second radio access network node.

In an embodiment, the connection information may comprise a beam index indication indicative of the user equipment having received first minimum system information corresponding to the first radio access network node via a provisioning downlink beam of the first radio access network node. Facilitating the performance of the connection operation may comprises facilitating, by the first radio access network node, transmitting, to the second radio access network node, a synchronization signal block request message comprising a request that the second radio access network node transmit a synchronization signal block message comprising second minimum system information corresponding to the second radio access network node. Furthermore, facilitating the performance of the connection operation may comprise facilitating, by the first radio access network node, transmitting, to the user equipment, a synchronization signal block measurement request message comprising a request that the user equipment measure a signal strength of the synchronization signal block message to determine a first signal strength corresponding to the second radio access network node. The synchronization signal block measurement request message may comprise a request that the user equipment transmit a second connection establishment message to the second radio access network node according to the second minimum system information based on the first signal strength being determined to satisfy a signal strength criterion.

The provisioning downlink beam is transmitted from the first radio access network node in a direction within a configured angular range relative to the first radio access network node. The angular range may be determined to encompass a vector directed from the first radio access network node to the second radio access network node. For example, the second radio access network node may be located within a sweep of the angular range within an angular range that is focused at a RAN.

The synchronization signal block request message may comprise a request that the second radio access network node transmit the synchronization signal block message a configured number of times. For example, the synchronization signal block request message may comprise a request that the second radio access network node transmit a synchronization signal block message two times and then resume suspension of transmitting of synchronization signal block message according to the network energy saving indication of the network energy saving message transmitted from the second radio access network node to the first radio access network node. Transmitting the synchronization signal block request message to the second radio access network node comprises transmitting the synchronization signal block request message to the second radio access network node via a backhaul communication link.

In an embodiment, the signal strength criterion may be determined by the user equipment by applying a function to a second signal strength, corresponding to the first radio access network node, measured at the user equipment. For example, the user equipment may apply a 'greater than' function or a 'less than' function to the second signal strength and compare the first signal strength to the second signal strength in conjunction with the function to determine whether the first signal strength or the second signal strength is higher. Thus, the signal strength criterion may comprise a combination of the second signal strength and the function.

In an embodiment, the connection information comprises a beam index indication indicative of the user equipment having received minimum system information corresponding to the first radio access network node via a non-provisioning downlink beam of the first radio access network node, and wherein facilitating the connection operation comprises facilitating, by the first radio access network node, establishing a connection with the user equipment. In an embodiment, the connection established with the user equipment may be with the first radio access network node. In another embodiment, the connection established with the user equipment may be with the second radio access network node.

In an embodiment, the second radio access network node is to activate the network energy saving mode based on a determined number of user equipment that are camped on the second radio access network node, and that initiate a transition from an IDLE mode to a CONNECTED mode, satisfying a configured transition mode criterion. The second radio access network node may determine whether the configured transition mode criterion is satisfied over a time window. As an example, the transition mode criterion may comprise the threshold shown in a configuration—if fewer camped user equipment than the threshold transition, or initiate transitioning, from idle mode to connected mode with respect to the second radio access network node during a configured period, which configured period is also indicated in configuration 1200, then the transition mode criterion is satisfied and the second radio access network node activates the network energy saving mode.

The network energy saving indication may comprise at least one of: a service-inactive indication indicative of at least one signaling message to be inactive during the network energy saving mode, a duration of the network energy saving mode, or a random access and preamble configuration corresponding to the second radio access network node. The at least one signaling message to be inactive during the network energy saving mode may comprise at least one of: a synchronization signal block message or a system information block 1 message.

In another example embodiment, a first radio access network node may comprise a processor configured to transmit, to a second radio access network node, a network energy saving message comprising a network energy saving indication indicative of a network energy saving mode at the first radio access network node. The first radio access network node and second radio access network node may be part of a configured group of radio access network nodes that are adjacent to one another, that are within a configured range of one another, or that provide communication signal coverage to a configured geographic area. The network energy saving message or network energy saving indication may correspond to the first radio access network node having determined to activate a network energy saving mode. The network energy saving message may comprise a configuration, and may comprise elements. The second radio access network node may be a radio access network node that has not determined to activate a network energy saving mode or a radio access network node for which a network energy saving mode is inactive. In an embodiment, the second radio access network node may be a radio access network node that has determined to activate a network energy saving mode but that can nevertheless assist, or accommodate, transmitting minimum system information on behalf of the first radio access network node while the first radio access network node is in a network energy saving mode corresponding to the network energy saving message.

The processor of the example first radio access network node may be configured to receive, from the second radio access network node responsive to the network energy saving message, a network energy saving mode assistance availability indication indicative of an availability of the second radio access network node to transmit, on behalf of the first radio access network node during the network energy saving mode, minimum system information corresponding to the first radio access network node. The processor of the example first radio access network node may be configured to activate the network energy saving mode based on a configured network energy saving mode criterion being determined to be satisfied, wherein the second radio access network node transmits, to a user equipment, the minimum system information corresponding to the first radio access network node. processor of the example first radio access network node may be configured to receive, from the user equipment, a connection establishment message according to the minimum system information corresponding to the first radio access network node and establish a connection with the user equipment according to the minimum system information corresponding to the first radio access network node.

The processor of the example first radio access network node may be further configured to determine a number of user equipment initiating transition from an IDLE mode to a CONNECTED mode, or from an INACTIVE mode to a CONNECTED mode during a configured transition-monitoring period to result in a determined number of transitioning user equipment. The configured network energy saving mode criterion may be satisfied by the determined number of transitioning user equipment being determined to be less than a configured number of transitioning user equipment during the configured transition-monitoring period, and wherein the configured transition-monitoring period comprises a sliding time window.

In an embodiment, the configured network energy saving mode criterion may be satisfied by the network energy saving mode assistance availability indication being indicative of the second radio access network node being available to transmit the minimum system information on behalf of the first radio access network node during the network energy saving mode. For example, instead of, or in addition to, satisfaction of the configured network energy saving mode criterion being a determined number of transitioning user equipment being less than a configured number of transitioning user equipment during the configured transition-monitoring period, satisfaction of the configured network energy saving mode criterion may be an indication, by the second radio access network node, that the second radio access network node is available to transmit SSB and/or SIB1 message signals corresponding to the first radio access network node on behalf of the first radio access network node.

In an embodiment, the processor of the first radio access network node may be further configured to determine a number of times that the first radio access network node receives synchronization signal block request messages from the second radio access network node to result in a determined number of received synchronization signal block request messages, wherein the configured network energy saving mode criterion is satisfied by the determined number of received synchronization signal block request messages exceeding a configured received synchronization signal block request messages threshold. For example, the second radio access network node requesting that the first radio access network node transmit an SSB message signal corresponding to the first radio access network more times that the configured threshold may be an indication that there are enough user equipment devices that can be better served by the first radio access network node that the second radio access network node to justify the first radio access network node terminating the network energy saving mode and resume sending its own SSB and/or SIB1 message signals.

In another example embodiment, a non-transitory machine-readable medium may comprise executable instructions that, when executed by a processor of a first radio access network node, facilitate performance of operations comprising receiving, from a second radio access network node, a network energy saving indication, comprising minimum system information corresponding to the second radio access network node, indicative of a network energy saving mode of the second radio access network node. The first radio access network node and second radio access network node may be part of a configured group of radio access network nodes that are adjacent to one another, that are within a configured range of one another, or that provide communication signal coverage to a configured geographic area. The network energy saving message or network energy saving indication may correspond to the second radio access network node having determined to activate a network energy saving mode. The network energy saving message may comprise a configuration, and may comprise elements. The first radio access network node may be a radio access network node that has not determined to activate a network energy saving mode or a radio access network node for which a network energy saving mode is inactive. In an embodiment, the first radio access network node may be a radio access network node that has determined to activate a network energy saving mode but that can nevertheless assist, or accommodate, transmitting minimum system information on behalf of the second radio access network node while the second radio access network node is in a network energy saving mode corresponding to the network energy saving message. Responsive to the network energy saving indication, transmitting, by the first radio access network node to a user equipment on behalf of the second radio access network node, the minimum system information corresponding to the second radio access network node during the network energy saving mode of the second radio access network node.

In an embodiment of the non-transitory machine-readable medium, the operations may further comprise responsive to the network energy saving indication, transmitting, by the first radio access network node to the second radio access network node, a network energy saving mode assistance availability indication indicative of an assistance period during which the first radio access network node is able to transmit the minimum system information corresponding to the second radio access network node during the network energy saving mode. The operations may further comprise receiving, during the assistance period from the user equipment via a provisioning beam, a first radio resource control (RRC) connection establishment message and transmitting, to the user equipment, minimum system information, corresponding to the second radio access network node, to be transmitted by the user equipment to the second radio access network node in a second RRC connection establishment message. The operations may further comprise receiving, during the network energy saving mode from the user equipment via a non-provisioning beam, a radio resource control (RRC) connection establishment message; and responsive to the RRC connection establishment message, establishing a connection with the user equipment.

In yet another example embodiment, a non-transitory machine-readable medium may comprise executable instructions that, when executed by a processor of a first radio access network node, facilitate performance of operations, comprising receiving, from a second radio access network node, a network energy saving indication, comprising minimum system information corresponding to the second radio access network node, indicative of a network energy saving mode of the second radio access network node; and responsive to the network energy saving indication, transmitting, by the first radio access network node to a user equipment on behalf of the second radio access network node, the minimum system information corresponding to the second radio access network node. The operations may further comprise receiving, from the user equipment, a first radio resource control (RRC) connection establishment message corresponding to a provisioning beam. Based on the on the first RRC connection establishment message having correspondence to the provisioning beam (e.g., the user equipment may have received an RRC message signal from the first radio access network node during connection establishment with the first radio access network node via a downlink beam that the first radio access network node designated as a provisioning beam) the operations may further comprise transmitting, to the user equipment, a second RRC connection establishment message requesting that the user equipment initiate establishment of a connection with the second radio access network node according to the minimum system information corresponding to the second radio access network node.

In an embodiment, the operations may further comprise receiving, from the user equipment a radio resource control (RRC) connection establishment message corresponding to a non-provisioning beam, and responsive to the RRC connection establishment message, establishing a connection with the user equipment.

BRIEF DESCRIPTION OF THE DRAWINGS

FIG. 4 illustrates a timing diagram of a radio access network node activating a network energy saving mode.

FIG. 6 illustrates flow diagram of an example embodiment method of inter-cell network energy saving mode coordination and cooperation.

FIG. 7 illustrates a block diagram of an example method embodiment.

FIG. 8 illustrates a block diagram of an example radio access network node embodiment.

FIG. 9 illustrates a block diagram of an example non-transitory machine-readable medium embodiment.

FIG. 12 illustrates an example idle mode NES configuration transmitted from a core network to a RAN.

FIG. 13 illustrates an example active NES setup message.

DETAILED DESCRIPTION OF THE DRAWINGS

Figure 1:
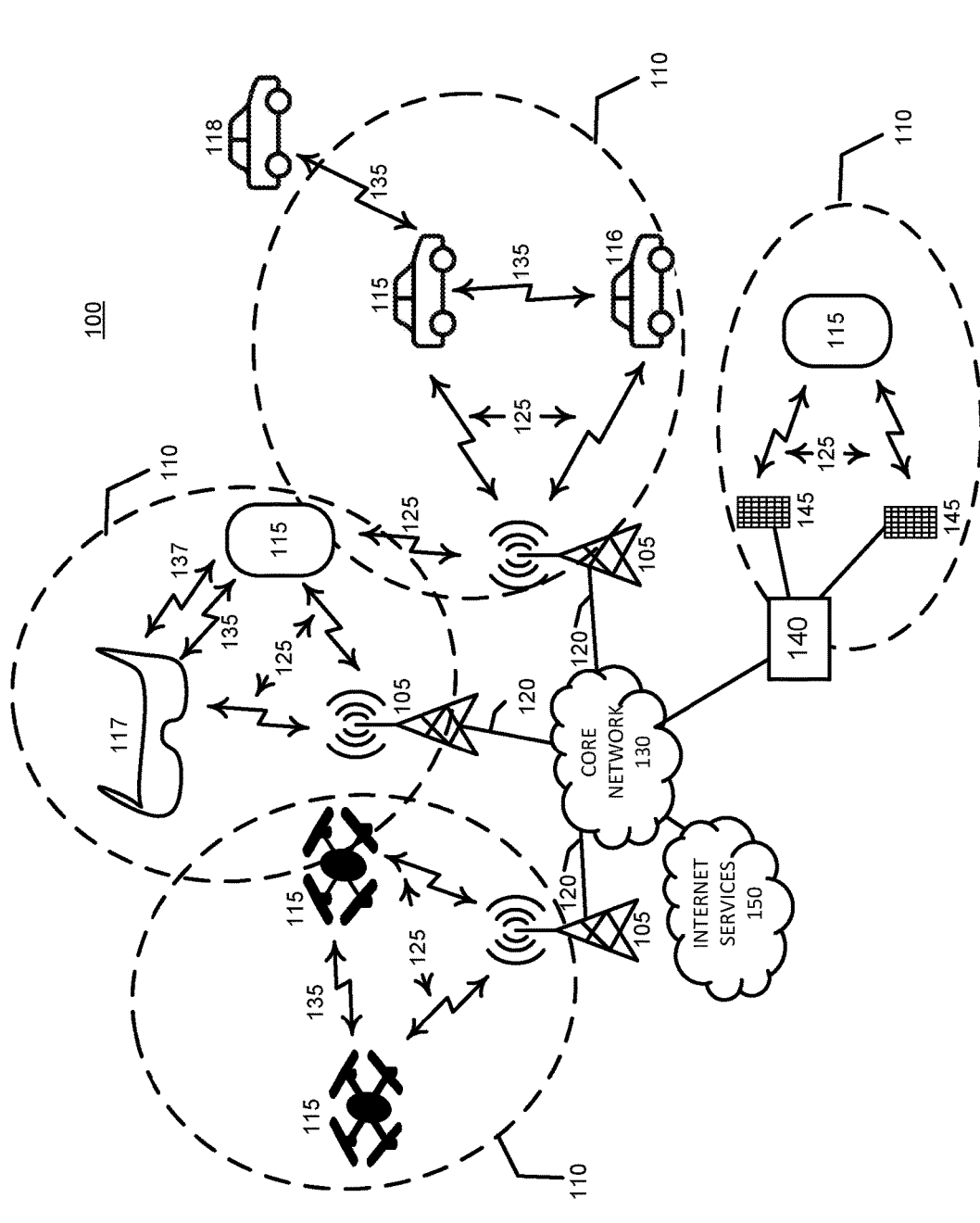
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multicarrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations

105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Network Energy Saving.

Energy or power saving is desirable in cellular networks, for both network equipment and user equipment. An objective of Network Energy Saving ("NES") mode is to facilitate a RAN node, that may be experiencing high power consumption, limited battery capacity, or power source disruptions, dynamically relaxing support one or more radio functions, or one or more radio services, that the RAN node may otherwise support, until an improvement in power situation is achieved, for example, an off-site power source of the RAN node being restored such that the RAN no longer relies on power from a battery on-site at the RAN, or until capacity of an on-site battery is restored to a configured level. Implementing NES may facilitate cost efficiency or power efficiency at the RAN node, (e.g., activating NES mode during a light load time for a RAN that experiences a high variance rate of traffic loads throughout a given day), or may facilitate service continuity, especially for emergency services/calls, in case of power source disruptions/outage.

Accordingly, a cell's RAN node may dynamically implement NES mode to temporarily halt support of, or offering of, high-energy-consumption radio services for a determined or configured period. Non-limiting examples of power-heavy radio services, or operations, include ultra-fast scheduling associated with mini-slot scheduling for latency-critical services, data duplication for enhanced radio reliability, and others. For already-connected user equipment (e.g., a user equipment that is RRC CONNECTED with a RAN), the RAN may already be aware of services, traffic types, and quality of service (QOS) targets, corresponding to traffic flows associated with the already-connected user equipment. Thus, the RAN node can determine to avoid NES mode activation to avoid negatively impacting critical traffic currently being served to the user equipment by the RAN. However, the RAN node may not be aware of a user equipment in an IDLE mode that are not actively connected to the RAN node even if the idle mode user equipment are within a coverage area, or range, of the RAN and the RAN node may not be aware of target QoS targets or services that may be needed, or requested, by an idle user equipment when user equipment later initiates connection to the RAN node. Thus, according to current implementations, an idle mode user equipment device, which may be camped on a NES-mode-activated RAN node, may only be aware of the NES mode activation by the RAN and the services which are currently not offered or not supported by the RAN node, when the user equipment initiates connection establishment procedures with the RAN node. Such initiation of connection procedures may comprise user equipment devices executing random access procedures and corresponding subsequent power-heavy and signaling-heavy connection establishment procedures. Only after initiating and connecting to the RAN node may the user equipment become aware that the RAN node has activated NES mode and is not currently offering or supporting a service or radio function that the user equipment may need to request, which may result in the user equipment discarding the established connection with the RAN and attempting reselection of another neighboring RAN node. Such connecting of the user equipment to the RAN node may lead to energy inefficiency at both the RAN node and at the user equipment as well as wasted signaling overhead and a delayed network access of impacted idle devices.

Currently, several schemes for implementing network power savings may be implemented. An example of a currently implemented NES mode procedure is Aggregated Paging Occasions ("APO"), wherein user equipment devices are aggregated to monitor and blindly decode the same paging occasion. This reduces the total number of paging occasions a RAN node has to transmit but comes at the expense of idle mode devices waking up and decoding the same paging occasion that may include paging information for only a single user equipment device, (e.g., a paging 'false alarm'). With APO, benefits of NES may be overshadowed by increased energy consumption at aggregated user equipment devices due to paging false alarms.

Another example of a currently implemented NES mode procedure is for a cell/RAN node to shut down and not accept new connection requests from user equipment that are not currently connected to the cell/RAN. Shutting down the accepting of new connection requests, or even stopping current device connections for all or part of one or more active services, is a straightforward NES solution, but one that may cause a negative impact on a user equipment's achievable quality of service. Furthermore, shutting down accepting of new connection request may lead to coverage gaps, where an idle user equipment may be unaware of, or 'blind' to, the halting of services resulting in the user equipment attempt to connect to the RAN (and thus expending battery power and time resources of the user equipment) notwithstanding that the RAN is not currently offering a service that the user equipment needs to the RAN. In case of a need for an emergency service, such as fire, rescue, law enforcement, etc., a user equipment being blind to radio services that have been deactivated by a RAN may impose a safety risk to a user of the blind user equipment.

Idle mode operations comprise several procedures for user equipment devices in idle mode, for example: determining coverage level/signal strength corresponding to surrounding cells; camping on, or selecting, a certain cell/RAN; or monitoring a detected coverage level/signal strength of the cell/RAN in case the user equipment moves or radio conditions change. Idle mode devices may be viewed as active user equipment that are not connected to a cell/RAN, thus the RAN network is not aware of locations of idle mode devices and a density of idle user equipment.

When a user equipment device is turned on, the user equipment device searches for and attempts decoding synchronization signal blocks ("SSB") of surrounding cells—SSBs are typically the sole always-transmitted signals of a 5G RAN node. An SSB enables idle mode devices to, for example: obtain downlink radio frequency ("RF") receiver synchronization with the surrounding cells/RANs; determine cell identifiers of the surrounding cells/RANs; and determine coverage levels using SSB downlink reference signal (e.g., the user equipment may determine signal strength based on reference signal received power ("RSRP") corresponding to each of the detected cells/RANs).

Accordingly, an idle mode device, based on detected SSBs, and determined coverage levels of surrounding cells/RANs corresponding to the determined cell/RAN identifiers, selects a stand-by cell/RAN to camp on that offers the best coverage level/determined signal strength. The user equipment initiates a connection to the stand-by cell/RAN (e.g., initiates an RRC connection) when the user equipment needs to connect to the network, (e.g., for receiving a call or for initiating an uplink data session without using time to perform cell selection, since the cell/RAN selection has already been performed). Thus, cell/RAN selection procedures are typically periodically executed regardless of whether the idle mode device needs to connect to the cell/RAN.

An idle mode device may initiate cell re-selection using the same procedure as cell selection but searching for another cell than the one previously selected/currently-selected at an instant according to an idle mode period configured at the user equipment or periodically according to a configuration received from the cell/RAN. Cell/RAN re-selection benefits a user equipment because a given selected cell/RAN that was optimum with respect to the user equipment at one time may not provide a determined strongest signal strength at a later time, which scenario may occur if the idle mode user equipment is moving between cells or if channel radio conditions change. Thus, when a coverage degradation of a currently selected cell is detected (based on a defined set of conditions being satisfied), an idle mode device may initiate idle-mode reselection. A cell/RAN node is typically not aware of a reselection determination made by an idle mode device.

For a given selected cell, an idle mode device monitors SSB information transmitted from the cell/RAN and monitors the determined paging occasion(s) corresponding to the cell/RAN. Monitoring SSB information facilitates an idle mode device staying up-to-date regarding coverage levels of the selected cell/RAN and triggering cell-reselection if needed to support an incoming call or data traffic transmission.

Thus, although cells/RANs transmitting of SSB blocks facilitates user equipment transition from a low-power IDLE mode to a higher power CONNECTED mode, transmission of SSB blocks is an energy-heavy operation at a cell/RAN. When an idle mode user equipment connects to a RAN node (e.g., transitions from idle to connected mode), the user equipment 'assumes' that services, or QoS profiles that it is pursuing, or requesting, are offered by the currently selected cell. If an idle mode user equipment transitions to a connected mode and then determines that a service that the user equipment needs is inactive at the RAN it is connected to, the UE has expended battery power and time resources in establishing the fruitless connection.

An SSB signal is a 5G signal that is always on, or always transmitted via the 5G radio interface, regardless of user equipment capability or battery condition. A user equipment uses an SSB to identify the existence of the cell/RAN that transmits the SSB, received coverage level from the cell/RAN (e.g., the coverage bar on a mobile handset screen), as well as additional cell information used for cell connection establishment and access by the user equipment. To reduce power consumption at a cell/RAN, for example when a RAN may be operating on a battery or just to reduce costs paid to an electric utility company for offsite power supplied to the RAN, relaxation of regular SSB transmission may be desirable. However, without continuous, regular transmission of an SSB signal, user equipment in an idle mode that are within a range such that the user equipment has an adequate coverage level to facilitate communication with the RAN may not identify a cell/RAN and may treat lack of a SSB with an adequately strong signal as a coverage gap, even if the user equipment is actually within a range of a RAN having a strong coverage at the user equipment such that adequate communication could be facilitated. Without being able to receive an SSB from a cell/RAN, network communication service to an idle user equipment cannot be due to lack of SSB transmission from the cell/RAN, which may be power-limited due to operating on battery power, for example. Accordingly, user equipment may attempt searching for service from another cell/RAN instead. Thus, SSB relaxation may come at the expense of degraded network access performance, especially in the case where coverage of an available adjacent cell (e.g., available because the adjacent RAN is transmitting SSB signaling messages) is much poorer than the coverage level of the RAN that has 'relaxed', or suspended, transmission of SSB signaling messages. Camping on a RAN the provides poor coverage instead of a RAN that may actually be closer, or that may provide a stronger signal strength, is suboptimal, and may be due only to the user equipment not being aware of a RAN that could provide stronger signal strength because of suspended SSB signal transmission from the otherwise more optimal RAN.

Accordingly, with embodiments disclosed herein an on-demand SSB transmission procedures may facilitate a power-limited cell/RAN suspend transmission of SSB instants because of, for example, user equipment inactivity or because active user equipment can be served, with a reasonable or comparable coverage level, from one or more adjacent power-capable cells/RANs, while avoiding coverage gaps, and thus avoiding negative impact on network access performance of user equipment. SSB relaxation techniques disclosed herein may comprise on-demand SSB transmission, while avoiding introducing the coverage gaps and accordingly, without impacting the device access.

Dynamic Cell Reselection Triggered by Network Energy Saving.

Embodiments disclosed herein may comprise facilitating on-demand transmission of power-consuming SSBs and minimizing, or eliminating, coverage gaps. Embodiments may comprise a core network 130 shown in FIG. 1 configuring one or more RAN nodes/gNBs with idle-mode NES setup configurations that may comprise a minimum threshold number of user equipment device transitions from idle to connected mode during a configured period of time to facilitate a RAN node to suspend SSB/idle mode transmissions (e.g., idle mode of user equipment). If the threshold is satisfied, (e.g., a RAN node does not have more than a configured number of idle mode devices in coverage or the RAN does not cover more than a configured number of inactive idle mode user equipment), a RAN may activate a NES mode for a configured NES period. Thus, power consumption may be significantly reduced at a NES-mode-activated RAN since periodically transmitting power heavy SSBs is power inefficient when user equipment in range of a RAN is sparce, or when a large number of user equipment within range of the RAN are idle or inactive.

If the RAN determines that there are fewer active user equipment than a configured threshold, the RAN node may stop, or suspend, transmitting regular, periodic SSBs for potential use by idle mode devices. The RAN node, which activated, or which may activate, idle mode NES at least by suspending transmission of SSB or SIB1 signaling messages, may exchange NES configurations with adjacent cells or RAN nodes, and coordinate with the other RANs with respect to idle mode coverage provisioning. Such coordination facilitates assisting, by RANs adjacent to the RAN that has suspended transmission of SSB signaling messaging, detection of a coordinating RAN by a user equipment and potential requesting, by an assisting adjacent RAN, that a RAN that has suspended transmission of SSB signaling messaging resume transmission of SSB signaling messages, at least a few times if not regularly or continuously. Although camping on an assisting RAN that is transmitting SSB signaling message by an idle mode user equipment may degrade quality of service if the received coverage level of the adjacent cells is much lower than non-available coverage level of the NES cell/RAN, exchanging NES configurations may facilitate the user equipment ultimately establishing a connection with the currently-NES-mode RAN that is not transmitting SSB information. A NES configuration may comprise an active period of the NES mode and an indication of which idle mode signals are to be halted during an active NES period. The indication of the signals to be suspended may comprise indications of a combination such as, for example: (SSB), (SSB, SIB1), or (SIB1). The NES mode configuration may facilitate adjacent RAN nodes in coordinating how inter-cell NES provisioning is performed. For example, in case a NES RAN node is halting, or suspending, SIB1 signal transmission, an adjacent power-capable cell can transmit SIB1 information corresponding to the NES-mode cell/RAN. Put another way, the adjacent/assisting RAN may function as a proxy of the RAN that has suspended SSB signal transmission, thus facilitating an idle mode device in not losing access to information that can facilitate the user mode in transitioning from an idle mode to a connected mode with the NES-mode RAN while the NES mode is still active at the power limited cell/RAN.

When an idle mode user equipment that may have transitioned from idle mode to connected mode on any of the adjacent cells is transitioned to a NES-mode-activated RAN, the assisting RAN may instruct the user equipment to perform access provisioning with the NES-mode-RAN, may instruct the NES-mode RAN to transmit SSB signaling messages, and nay instruct the user equipment to measure signal strength of an SSB now being transmitted by the NES mode RAN.

Accordingly, an idle mode device may measure SSBs from the NES RAN. On condition of the idle mode device receiving a better coverage level from the NES cell, based on a signal strength determined from analyzing SSBs that are now being transmitted from the NES mode RAN, than the current power-capable adjacent cell, the idle mode user equipment may transmit a connection abort request to the RAN that the user equipment is currently connected with that is assisting the NES mode RAN and establish a connection towards the NES mode RAN instead. Thus, embodiments disclosed herein facilitate a power-limited cell/RAN only transmitting SSB signals when there is an idle mode device potentially in the RANs coverage range that is actually attempting to connect to core network 130 via the RAN. A RAN can operate an active NES mode and can activate SSB signaling when requested by an assisting RAN to minimize effects of coverage gap that might otherwise exist if the RAN with the better coverage with respect to the user equipment were to continue suspending of transmitting of SSB signaling message. Embodiments disclosed here are efficient, from the signaling overhead perspective, when assisted connecting to a RAN that is operating an active NES mode does not happen frequently (e.g., when it is infrequent that a user equipment connects to a power capable RAN, measures on-demand SSBs from NES RAN, aborts the first connection with the power-capable RAN, and establishes a connection towards the NES mode RAN).

Figure 2A:
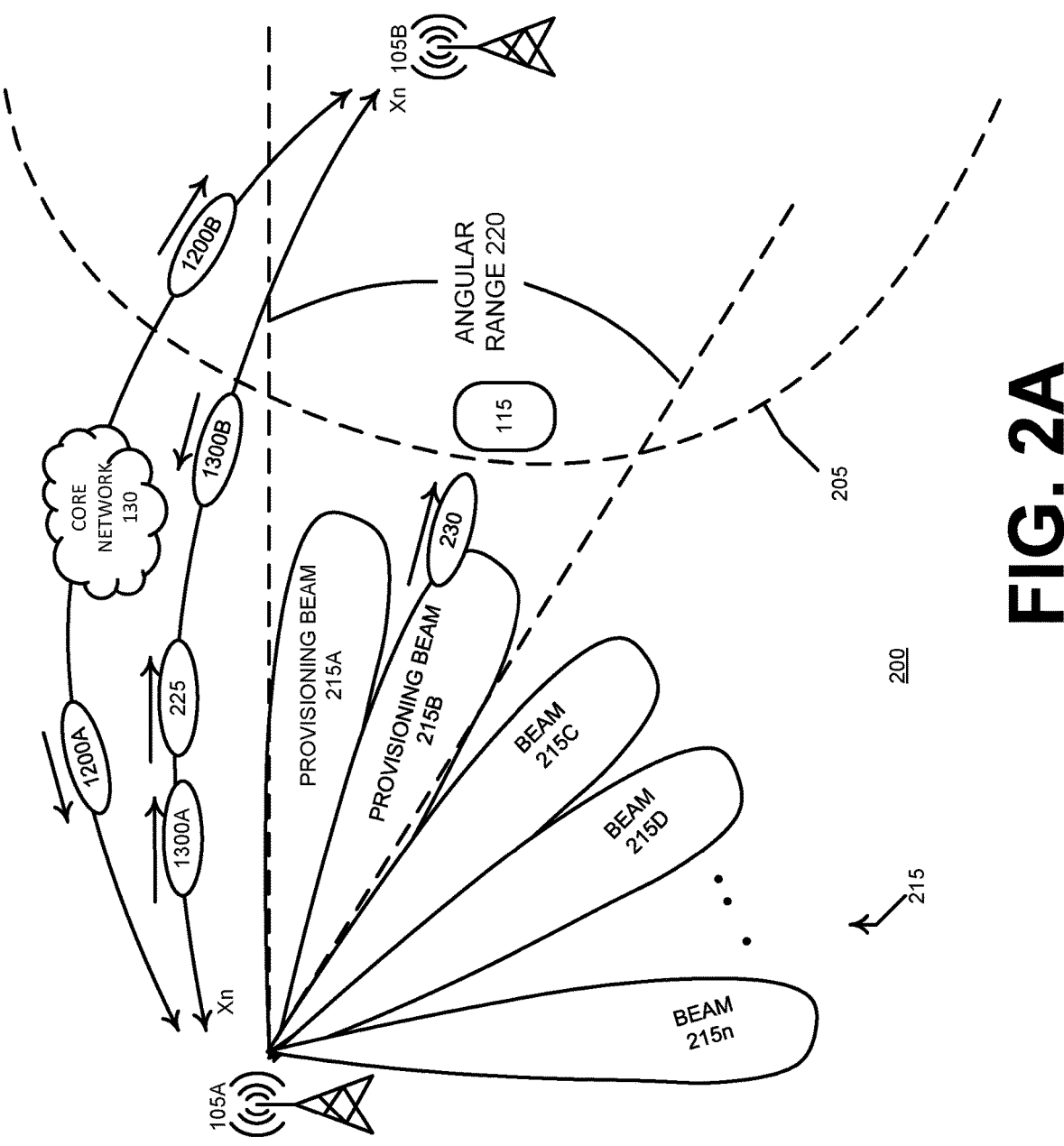
FIG. 2A illustrates an example embodiment of inter-cell network energy saving mode coordinating and cooperation with radio access network node reselection.

Turning now to FIG. 2A, the figure illustrates environment 200. In environment 200, RAN 105A may assist RAN 105B, which may have activated, or may be able to activate, a network energy saving mode. Core network 130 may configure RAN nodes 105a and 105B with respective idle mode NES configuration(s) 1200A and 1200B. As shown in FIG. 12, idle mode NES configuration 1200B may comprise a network energy saving mode criterion, for example a minimum threshold number of idle mode devices transitioning to a connected mode that are within a configured coverage signal strength range 205 of RAN 105B (e.g., a number of user equipment attempting to establish a connection toward a RAN node). On condition of the criterion being satisfied, (e.g., fewer user equipment attempting to connect to RAN 105B, which scenario may occur in a sparsely populated area or during periods of nighttime when there are not many users using their user equipment to access RAN 105B), RAN 105B node may activate NES mode. Thus, on condition of an actual number of idle mode equipment transitioning from, or attempting to transition from, idle mode to connected mode, being less than the configured network energy saving mode criterion threshold, RAN 105B node may activate a network energy saving mode, and accordingly suspend transmission of messages, such as SSBs or SIB1 signals, that might otherwise be used by idle mode user equipment to facilitate performing of connection establishment operations with RAN 105B.

Figure 3:
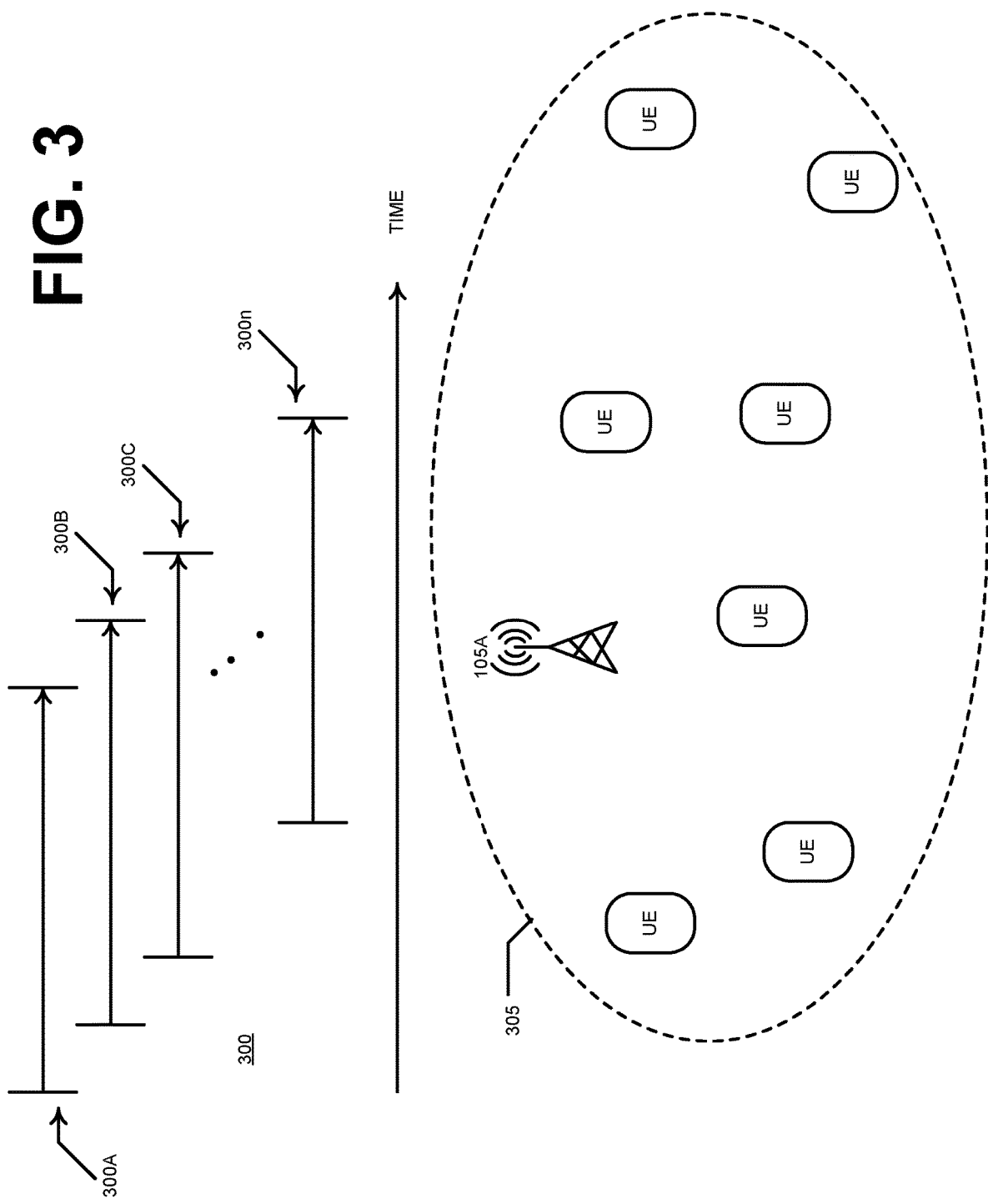
FIG. 3 illustrates an example sliding window period criterion to trigger a network energy saving mode by a radio access network node.

Configuration 1200 may also comprise a rolling period of time 300, shown in FIG. 3, over which the idle mode NES threshold should be provisioned and checked. Period 300 can be in terms of milliseconds, slots, subframes or frames. Period 300 may comprise recurring, overlapping periods 300A-300n. If a number of user equipment within a coverage range 305 that try to connection to connect to RAN 105A during one of windows 300A-300n is less than a configured network energy saving mode criterion threshold, RAN 105A may activate a network energy saving mode.

Continuing with description of FIG. 2A, upon satisfaction of the configured network energy saving mode criterion threshold, (e.g., a number of idle-to-connected mode transitioning devices being less than the configured network energy saving mode criterion threshold), the RAN node 105B may activate a network energy saving mode. Accordingly, RAN node 105B suspends, or halts, transmitting of signaling messages that might otherwise convey connection information to idle user equipment, for example RAN 105B may suspend transmission of SSB and/or SIB1 message signals. Idle mode user equipment 115 will not be able to detect coverage by RAN 105B. Accordingly, network energy saving coverage provisioning may be implemented to avoid a coverage gap 'perceived' by UE 115 and thus avoid a concomitant negative impact on network access performance by UE 115.

NES-mode-activated cell/RAN 105B may exchange with adjacent/assisting cell/RAN 105A an NES active setup configuration 1300B, over backhaul links, and RAN 105A may exchange a similar NES setup configuration 1300A with RAN 105B. A NES setup configuration 1300 may comprise a network energy saving message comprising a network energy saving indication indicative of a network energy saving mode corresponding to a RAN node that is transmitting the setup configuration to another RAN. An example NES setup configuration 1300, shown in FIG. 13, may comprise new information elements. A new information element of a setup configuration 1300 may comprise a suspended-signaling indication 1305 indicative of one or more idle mode signal transmissions to be suspended during an active NES period. A suspended-signaling indication may comprise an index that indicates a combination of a configured set of signals—example combination may comprise: (SSB), (SSB, SIB1), or (SIB1). For example, a suspended signaling index indication index of 0 may indicate that NES cell/RAN 105B will be suspending only SSB transmissions during a period that NES mode is active, but may continue to transmit SIB1 blocks.

Another new information element of a configuration 1300 may comprise an NES mode active period of time 1307. Another new information element of a NES setup configuration 1300 may comprise actual SIB1 contents 1309 of NES cell/RAN 105B, including configurations for random access and preamble configurations corresponding to RAN 105B. Providing SIB1 content information 1309 corresponding to RAN 105B from RAN 105B to RAN 105A may facilitate RAN 105A in making UE 115 aware of some of SIB 1 information 1309 corresponding to RAN 105B. Thus, adjacent/assisting power capable RAN 105A can have a SIB1 context of NES-active RAN 105B and transmit to idle mode UE 115 SIB1 information 1309 on behalf of RAN 105B to the UE in establishing RRC connection operations with RAN 105B. SIB1 information 1309 may be referred to as minimum system information.

As shown in FIG. 2A, to transition from idle mode to connected mode, UE 115 may attempt random access and connection establishment with assisting RAN 105A during an active NES mode at RAN 105B. RAN 105A may determine whether to perform NES coverage provisioning of UE 115. Power-capable cell/RAN 105A (e.g., a RAN that is not running on battery power) may request that UE 115 perform coverage measurements (e.g., signal strength measurements) with respect to RAN 105B before accepting a connection request from the UE. Performing such coverage measurement facilitates RAN 105A in determining whether UE 115 would be better served by RAN 105B (e.g., have better signal strength from RAN 105B)—if UE 115 can obtain satisfactory coverage/signal strength from RAN 105B, RAN 105A may opt to decline establishing, or continuing, a connection with the UE if doing so would impact performance of one or more connections between RAN 105A and other user equipment that RAN 105A may be currently serving that are better served by RAN 105A.

To determine whether to establish a connection in response to a connection request from UE 115, RAN 105A may determine whether a connection request from the UE corresponds to one of provisioning beams 215A or 215B. The connection request may comprise a connection establishment message comprising connection information corresponding to RAN 105A. Provisioning beams 215A or 215B may comprise specially designated (by RAN 105A) beams of beams 215A-215n corresponding to RAN 105A that RAN 105A designates as provisioning beams. (It will be appreciated that more than two or less than two beams corresponding to RAN 105A may be designated as provisioning beams.) RAN 105A may designate as provisioning beams one or more beams that point in a direction within a configured angular range (which may have an associated angular tolerance criterion) relative to RAN 105A. As shown in FIG. 2A, provisioning beams 215A and 215B point, with respect to RAN 105A, generally in a direction toward, or within angular range 220 that points generally toward, RAN 105B. (Contrast directions of beams 215A and 215B being in a direction that is generally toward RAN 105B and beams 215C-215n that do not generally point from RAN 105A toward RAN 105B.)

If RAN 105A receives a connection request message from UE 115 corresponding to a provisioning beam, for example provisioning beam 215B, as indicated by a beam index that may accompany the connection request message, RAN 105A may transmit to RAN 105B an on-demand synchronization signal block request message 225 comprising a request that RAN 105B transmit a synchronization signal block message comprising minimum system information corresponding to RAN 105B. (Minimum system information may comprise information needed by a user equipment to initiate random access procedures with a RAN to which the minimum information corresponds, e.g., information that may be contained in an SSB message signal or an SIB1 message signal.) RAN 105A may determine to perform NES coverage provisioning for UE 115 based on a request received from UE 115 comprising a beam index corresponding to beam 215B being indicative of the UE having received minimum system information, or other connection information, corresponding to RAN 105A (e.g., the UE received SIB1 information) via downlink/provisioning beam 215B.

If RAN 105A determines that UE 115 received minimum system information corresponding to RAN 105A via provisioning beam 215B (or via beam 215A which is also a provisioning beam as shown in FIG. 2A), RAN 105A may perform NES coverage provisioning of UE 115 toward NES-mode RAN 105A. NES coverage provisioning may comprise RAN 105A transmitting to RAN 105B an on-demand SSB request message 225 requesting activation of SSB and/or SIB1 transmission for the requesting idle mode UE 115. A signaling operation related to transmitting of the on-demand SSB request message 225, which may be referred to as a synchronization signal block request message, may be transmitted via backhaul interface links between RAN 105A and 105B. RAN 105A may also transmit an NES SSB measurement request message 230 toward UE 115 requesting that the UE determine a signal strength corresponding to an SSB message signal transmitted by RAN 105B, which may have transmitted the SSB signal in response to the synchronization signal block request message 225 received from RAN 105A.

In an embodiment, instead of RAN 105A requesting that RAN 105B transmit an SSB message signal for UE 115 to monitor and determine a signal strength corresponding to the SSB message signal, RAN 105A may transmit to the UE a request (including minimum system information corresponding to RAN 105B) that the UE initiate establishment of a connection with RAN 105B using minimum system information (e.g., SIB1 information) that RAN 105A received in configuration 1300B from RAN 105B without transmitting a request to RAN 105B requesting that RAN 105B transmit an SSB message signal. Thus, UE 115 may establish a connection with RAN 105B using minimum system information corresponding to RAN 105B without RAN 105B transmitting an SSB or SIB1 message signal that contains the minimum system information.

UE 115 may determine a signal strength of an on-demand SSB signal transmitted from RAN 105B and based thereon determine a corresponding coverage level of RAN 105B with respect to the UE. If UE 115 determines that coverage level corresponding to RAN 105B is better than a received coverage level corresponding to RAN 105A, the UE may transmit a connection abort request message toward RAN 105A and attempt to establish a connection with RAN 105B. As part of the NES coverage provisioning, and on condition of a SIB1 transmission corresponding to RAN 105B having been delegated to, or performed by, RAN 105A, RAN 105A may schedule and transmit SIB1 information (e.g., minimum system information) corresponding to RAN 105B toward UE 115 upon receiving a connection abort request from the UE.

Figure 2B:
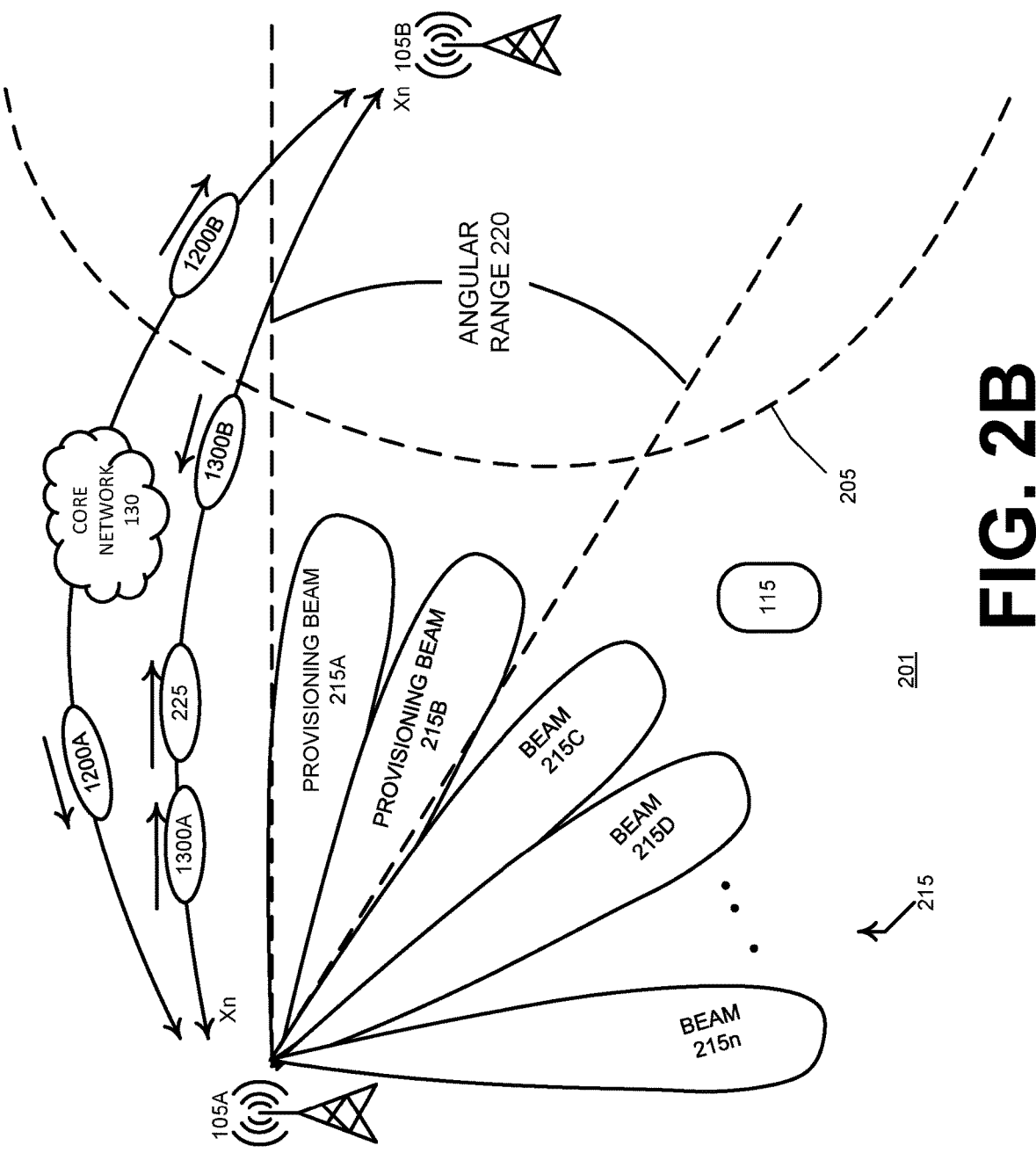
FIG. 2B illustrates an example embodiment of inter-cell coordination and cooperation with a user equipment connecting to a currently-selected radio access network node during a network energy saving mode period.

Turning now to FIG. 2B, the figure illustrates environment 201. In environment 201, RAN 105A may assist RAN 105B, which may have implemented a network energy saving mode. In contrast to environment 200 shown in FIG. 2A, in environment 201 UE 115 is not within configured angular range 220 with respect to RAN 105A or coverage range 205 with respect to RAN 105B. Thus, a connection request message received by RAN 105A from UE 115 would not include a beam index corresponding to a provisioning beam 215A or 215B. Thus, instead of RAN 105A sending a synchronization signal block request message 225 to RAN 105B requesting that RAN 105B transmit an SSB message signal, as in an embodiment described in reference to FIG. 2A, RAN 105A operating in environment 201 may establish a connection with UE 115 and RAN 105B may continue suspension of transmitting of information signals indicated by indication 1305 in configuration 1300 shown in FIG. 13.

Figure 2C:
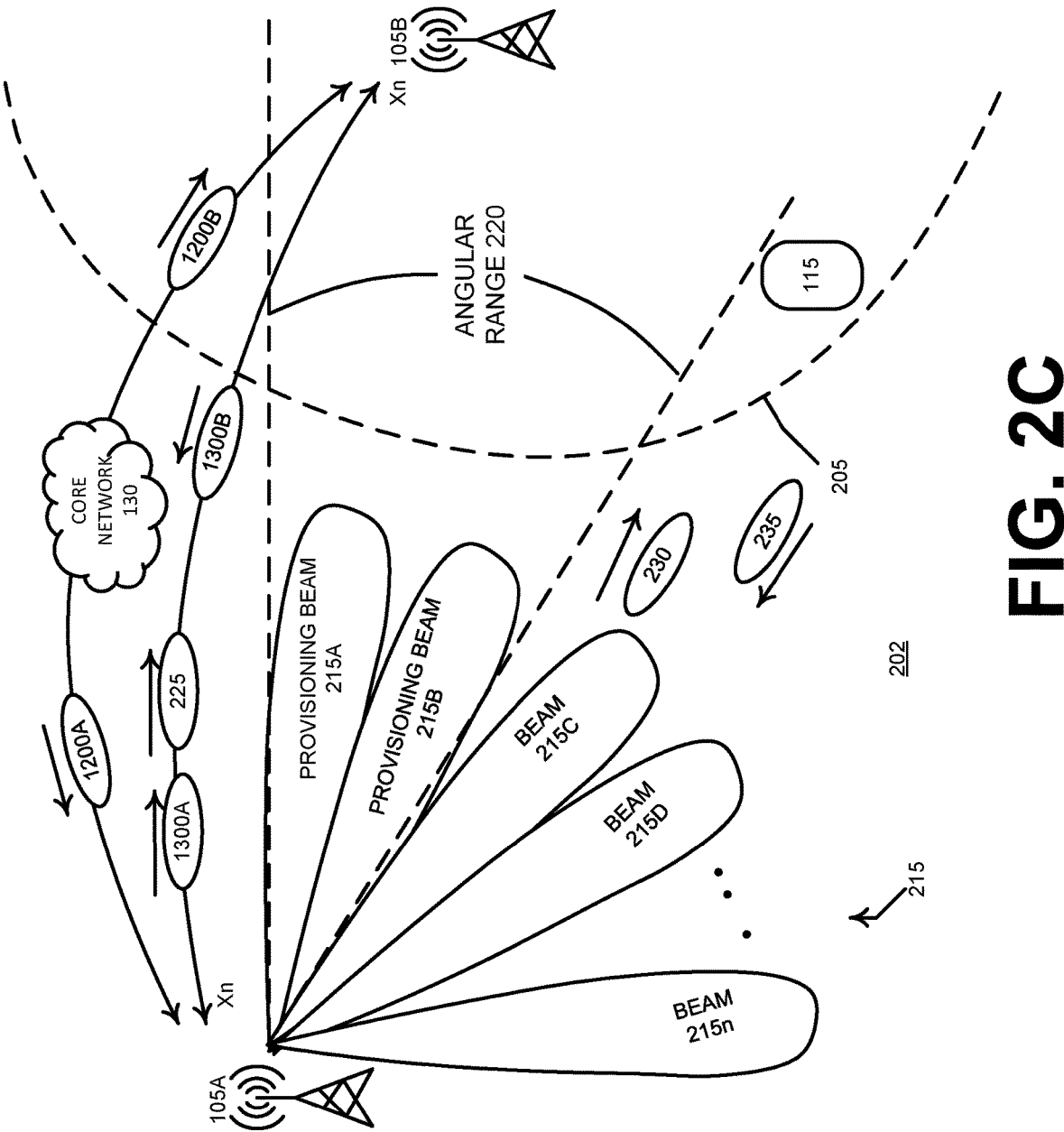
FIG. 2C illustrates an example embodiment of inter-cell coordination and cooperation with a user equipment aborting connection to a currently-selected radio access network node and reselecting a radio access network node that has activated a network energy saving mode.

Turning now to FIG. 2C, the figure illustrates environment 202. In environment 202, RAN 105A may assist RAN 105B, which may have implemented a network energy saving mode. In contrast to environment 201 shown in FIG. 2B, in environment 202 UE 115 is not within configured angular range 220 with respect to RAN 105A but is within coverage range 205 with respect to RAN 105B. Thus, a connection request message received by RAN 105A from UE 115 would not include a beam index corresponding to a provisioning beam 215A or 215B. However, because UE 115 is within coverage range 205 with respect to RAN 105B, the UE may determine that a signal strength of an SSB signal received from RAN 105B is stronger than a signal strength corresponding to an SSB signal received from RAN 105A. If UE 115 determines that a signal strength of an SSB signal received from RAN 105B is stronger than a signal strength corresponding to an SSB signal received from RAN 105A, the UE may send an abort connection request message 235 to RAN 105A and perform an RRC establishment with RAN 105B using information corresponding to RAN 105B received from RAN 105A in message 230. Upon receiving abort connection request message 235, RAN 105 may flush connection information corresponding to the connection previously established with UE 115 and terminate the connection with the UE.

FIG. 4 illustrates a timing diagram of an example embodiment method 400 of radio access network node 115A activating a network energy saving mode. At act 405, RAN node 105B receives an idle mode network energy saving (NES) configuration, such as configuration 1200 as described in reference to FIG. 12, from core network 130, over backhaul links. Configuration 1200 may comprise a maximum threshold on a number of user equipment idle-to-connected mode transitions and an associated rolling period of time, or a sliding time window, in terms of milliseconds, frames, or slots as described in reference to FIG. 3. At act 410, RAN node 105B may monitor and determine a number of idle mode user equipment devices that transitioned from idle/inactive mode to connected mode during a configured rolling period of time 300A-300n as shown in FIG. 3. that may have been included in NES configuration 1200 received from core network 130 at act 405. At act 415, on condition of a number of user equipment devices that transitioned from idle to connected mode during the determined rolling period of time being lower than the configured threshold, RAN node 105B may shut down, suspend, or otherwise stop allowing new connections with idle-mode user equipment devices and suspend transmission of synchronization signal block (SSBs) message signals and subsequent system information block 1 (SIB1) message signals. At act 420, RAN node 105B may transmit a NES configuration update, in a message 1300 as described in reference to FIG. 13, via XN/backhaul links, towards adjacent/assistance RAN node 105A, indicating an active idle mode NES setup configuration including one or more of the following information elements: NES setup indication 1305 from a combination of barred idle-mode transmissions during the active NES period as of ([SSB], [SSB, SIB1], or [SIB1]), an active period 1307 of the idle mode NES, or SIB1 contents 1309 corresponding to RAN 105B for transmission by RAN 105A when RAN 105B does not transmit the SIB1 information during an active NES period (e.g., a period indicated by information element 1307).

Figure 5:
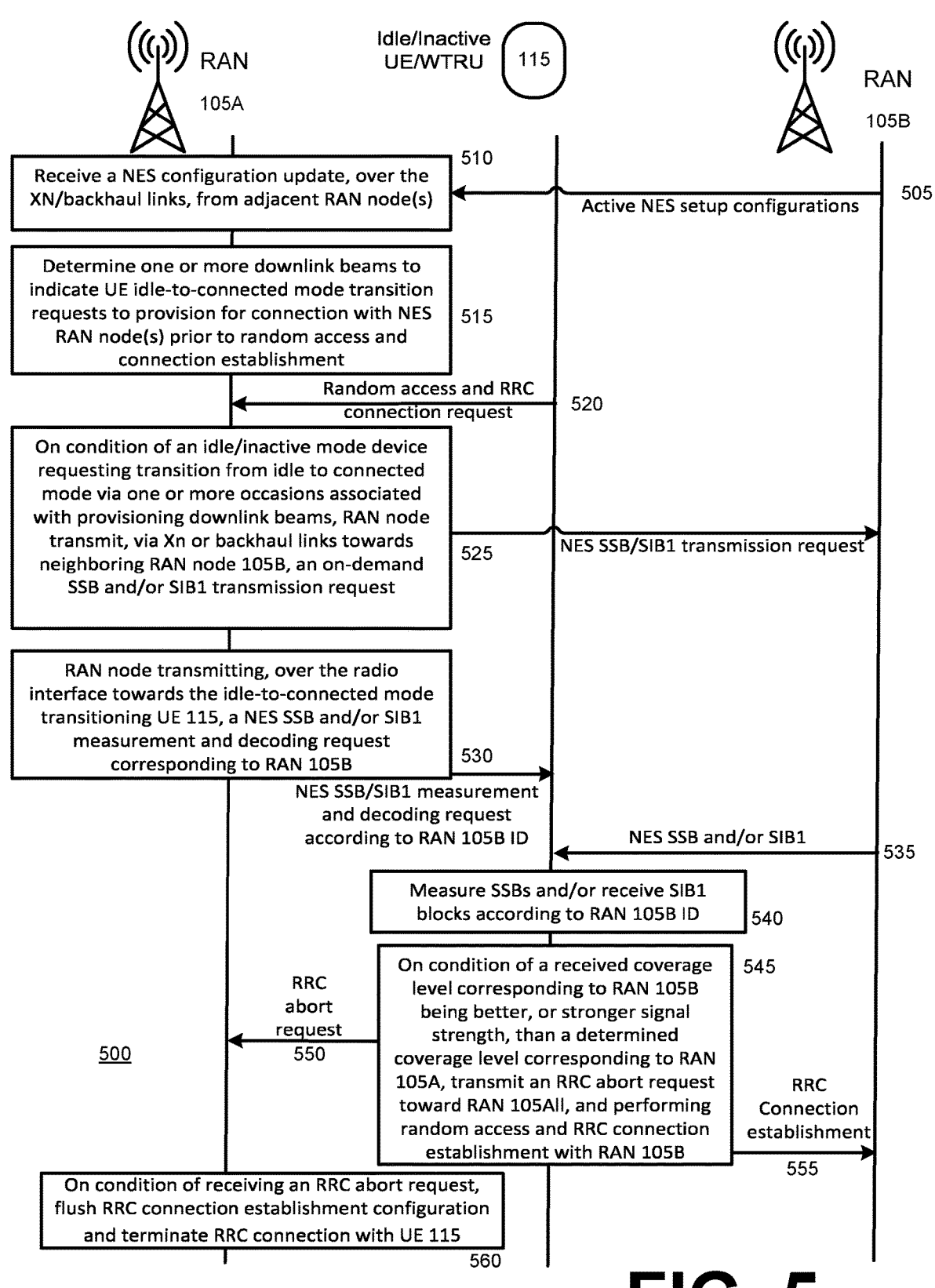
FIG. 5 illustrates a timing diagram of an example embodiment of inter-cell network energy saving mode coordination and cooperation.

FIG. 5 illustrates a timing diagram of an example embodiment 500 of inter-cell network energy saving mode coordination and cooperation between RAN 105A and RAN 105B. RAN 105B transmits, at act 505, a NES configuration message 1300 to RAN 105A via XN/backhaul links. RAN 105A receives NES configuration information at act 510. At act 515, RAN node 105A may determine one or more provisioning downlink beams as described in reference to FIG. 2A. If RAN 105A receives RRC connection information from UE 115 at act 520 via one of the provisioning beams, RAN 105A may transmit at act 525 an on-demand SSB request message via Xn, or backhaul links, towards neighboring NES RAN 105B requesting that RAN 105B transmit an SSB and/or SIB1 message signal. At act 530, RAN node 105B may transmit via a radio interface (e.g., wireless communication link 125 shown in FIG. 1) towards UE 115 transitioning from idle-to-connected mode, one or more NES SSB and/or SIB1 measurement and decoding requests requesting that UE 115 perform signal strength measurements and decoding of an SSB message signal to be transmitted by RAN 105B.

At act 535, RAN 105B may transmit an SSB and/or an SIB1 message signal. At act 540, UE 115 may measure a signal strength of a signal transmitted by RAN 105B at act 535 and decode connection information that may be contained therein. At act 545, UE 115 may determine that a signal strength of an SSB signal transmitted by RAN 105B at act 535 may be a stronger signal strength than an SSB signal transmitted by RAN node 105A during connection establishment at act 520. If UE 115 determines that RAN node 105B, which is currently operating an active NES mode, provided a stronger SSB signal at act 535 than RAN 105A did at act 520, UE 115 may transmit at act 550 an RRC abort request message to RAN 105A requesting that the RRC connection established at act 520 be terminated. At act 555, UE 115 may perform RRC connection establishment procedures to establish a connection with RAN 105B according to connection information received from RAN 105B at act 540 (or received from RAN 105A at act 530). The abort request message transmitted at act 550 may comprise an identifier corresponding to RAN 105B. At act 560, responsive to a connection abort request message received at act 550, RAN 105A may flush connection establishment configuration information corresponding to the connection with UE 115 established at act 520, and terminate the connection established at act 520.

If at act 545 UE 115 determines that an SSB signal strength corresponding to an SSB signal transmitted from RAN 105B at act 535 is not stronger than an SSB signal strength of an SSB signal transmitted corresponding to connection establishment at act 520, RAN 105A may continue RRC connection establishment requested by UE 115 at act 520.

FIG. 6 illustrates a flow diagram of an example embodiment method 600 of inter-cell network energy saving mode coordination and cooperation. Method 600 begins at act 605. At act 610, one or more RAN nodes receive network energy saving configuration information. The network energy saving configuration information may be received from a core network, such as, for example, core network 130 shown in FIG. 1. Network energy saving configuration information may comprise information shown in configure 1200 in FIG. 12, such as, for example, a criterion for determining when a RAN enters a network energy saving mode. At act 615, RAN nodes that are adjacent to one another, or that may be within a configured range of one another even if not necessarily adjacent to one another (these RAN nodes may be referred to as proximate RAN nodes), may share corresponding respective network energy saving messages with each other. The network energy saving messages shared at act 615 may be shared among RAN nodes via an Xn interface link or via other backhaul links. Network energy saving messages shared at act 615 may comprise information elements 1305, 1307, or 1309 of configuration 1300 shown in FIG. 13. One of the adjacent, or proximate, RAN nodes may activate a network energy saving mode at act 620 according to information shared with one or more of the other adjacent, or proximate, nodes at act 615.

At act 625, a user equipment may determine to transition from an idle mode to a connected mode, or from an inactive mode to a connected mode. The user equipment may determine to make such transition to receive traffic for which it has received an indication via a paging occasion that is available for transmission to the user equipment. At act 630, the user equipment may receive RRC signaling from one of the adjacent/proximate RAN nodes that has not activated a network energy saving mode. The user equipment may in fact be closer to, or be in a location where a signal with, the RAN node that has activated a network energy saving mode would be stronger than a signal from the RAN node that has not activated a network energy saving mode. If the closer RAN node is not transmitting minimum system information, such as, for example, SIB1 information, via an SSB message signal, the user equipment may not attempt to connect with the closer RAN node. Accordingly, at act 635, the user equipment and the RAN node that has not activated a network energy saving mode may establish a connection.

At act 640, the RAN node that has not activated a network energy saving mode may determine whether signaling associated with the connection established at act 635 was received from the user equipment with an indication indicative of a provisioning beam corresponding to the RAN node that has not activated a network energy saving mode. The RAN node that has not activated the energy saving mode may designate one or more downlink beams as provisioning beams. Thus, when the RAN node that has not activated a network energy saving mode receives RRC signaling from a user equipment that indicates that the user equipment may have received connection information corresponding to the RAN node that has not activated a network energy saving mode via one of the provisioning beams, the RAN node that has not activated a network energy saving mode may determine that the user equipment may be better served by the RAN a node that has activated a network energy saving mode. The RAN node that has not activated a network energy saving mode may designate the one or more provisioning beams as provisioning beams based on the beams' respective directional alignment with respect to the RAN that has activated a network energy saving mode. For example, if the RAN node that has not activated a network energy saving mode receives an RRC signaling message from the user equipment that contains an indication of a provisioning beam that is directed along a line between the RAN node that has activated the network energy saving mode at one end and the RAN node that has not activated a network energy saving mode at the other end, the RAN node that has not activated the network saving mode may determine that the user equipment should determine, based on signal strength for example, whether the user equipment might be better served by the RAN node that has activated the network energy saving mode. On the other hand, the RAN node that has not activated a network energy saving mode may not designate downlink beams as provisioning beams that do not point generally in a direction toward the RAN node that has activated a network energy saving mode. For example, if the user equipment transmits RRC signaling messages to the RAN node that has not activated a network energy saving mode that comprises an indication indicative of A downlink beam that is perpendicular to a beam that is pointed directly at the RAN node that has activated the network energy saving mode, the RAN node that has not activated the network energy saving mode may presume that there is a high likelihood that the user equipment is closer to the RAN that has not activated energy saving mode than to the RAN node that has activated the network energy saving mode. Accordingly, the RAN node that has not activated an energy saving mode may use a beam index indication received from the user equipment during establishment of the connection at act 635 to determine a likelihood of whether the user equipment would probably be best served by the RAN node that has not activated the network energy saving mode or by the RAN node that has activated the network energy saving mode.

If a determination made at act 640 is that the connection made at act 635 was not made via a provisioning beam, at act 645, the RAN node that has not activated the network energy saving mode may determine to continue the connection with the user equipment at act 650, and method 600 may advance to act 685 and end.

Returning to description of act 645, if determination is made at act 640 that RRC signaling at act 635 corresponds to a provisioning beam, method 600 advances to act 655. At act 655, the RAN node that has not activated a network energy saving mode may request that the RAN node that has activated a network energy saving mode transmit minimum system information, corresponding to the RAN node that has activated a network energy saving mode, an SSB signal, SSB and SIB1 message signaling, or SIB1 message signaling. At act 660, the RAN node that has not activated a network energy saving mode requests that the user equipment monitor an SSB signal transmitted by the RAN node that activated the network energy saving mode. The RAN node that has not activated the energy saving mode may transmit information, which may have been received in messaging from the RAN node that activated the network energy saving mode at act 615, to be used by the user equipment to monitor the SSB signal to be transmitted by the RAN node that has activated the network energy saving mode.

At act 665, the user equipment may monitor an SSB signal transmitted by the RAN node that activated the network energy saving mode, decode information contained in the SSB signal, and determine a signal strength corresponding to the SSB signal transmitted from the RAN node that activated the network energy saving mode. If the user equipment determines at act 665 that the signal strength of the SSB signal received from the RAN node that activated the network energy saving mode is not as strong as a signal strength of signaling received from the RAN node that has not activated an network energy saving mode, method 600 advances to act 650, the connection between the user equipment and the ran node that has not activated the network energy saving mode continues, and method 600 advances to act 685 and ends.

Returning to description of act 665, if the user equipment determines that a signal strength corresponding to the SSB signal received from the RAN node that activated the network energy saving mode is stronger than a signal strength corresponding to a signal received from the radio access network node that has not activated a network energy saving mode, method 600 advances to act 670. At act 670 the user equipment establishes a connection with the RAN node that activated the network energy saving mode and at act 675 the user equipment transmits a connection abort request to the RAN that has not activate a network energy saving mode. At act 680, the RAN node that has not activated a network energy saving mode flushes connection information corresponding to the user equipment connection that was established at act 635. Method 600 advances to act 685 and ends.

In an embodiment, if a determination is made at act 640 that RRC signaling at act 635 corresponds to a provisioning beam, the RAN that has not activated a network energy saving mode may request that the user equipment establish a connection with the RAN that activated a network energy saving mode using minimum system information corresponding to information received at act 615 from the RAN that activated a network energy saving mode. Thus, the RAN that has not activated a network energy saving mode may not request that the RAN that activated a network energy saving mode transmit an SSB message signal, thus bypassing acts 655, 660, and 665. Accordingly, in an embodiment, method 600 may follow the 'N' path from block 645 and advance to act 670, and acts 670, 675, and 680 may be performed as described above, thus obviating the transmitting of an SSB by the RAN that activated the network energy saving mode.

Turning now to FIG. 7, the figure illustrates an example embodiment method 700 comprising at block 705 receiving, by a first radio access network node comprising a processor from a second radio access network node, a network energy saving message comprising a network energy saving indication indicative of a network energy saving mode corresponding to the second radio access network node; at block 710 responsive to the network energy saving indication, transmitting, by the first radio access network node to the second radio access network node, a network energy saving mode assistance indication indicative of the first radio access network node being able to assist the second radio access network node during the network energy saving mode; at block 715 receiving, by the first radio access network node from a user equipment, a first connection establishment message comprising connection information corresponding to the first radio access network node; at block 720 facilitating, by the first radio access network node, performance of a connection operation with respect to the user equipment based on the connection information; at block 725 wherein the connection information comprises a beam index indication indicative of the user equipment having received first minimum system information corresponding to the first radio access network node via a provisioning downlink beam of the first radio access network node; at block 730 wherein facilitating the performance of the connection operation comprises: facilitating, by the first radio access network node, transmitting, to the second radio access network node, a synchronization signal block request message comprising a request that the second radio access network node transmit a synchronization signal block message comprising second minimum system information corresponding to the second radio access network node; at block 735 facilitating, by the first radio access network node, transmitting, to the user equipment, a synchronization signal block measurement request message comprising a request that the user equipment: measure a signal strength of the synchronization signal block message to determine a first signal strength corresponding to the second radio access network node; and at block 740 transmit a second connection establishment message to the second radio access network node according to the second minimum system information based on the first signal strength being determined to satisfy a signal strength criterion.

Turning now to FIG. 8, the figure illustrates an example first radio access network node, comprising at block 805 a processor configured to transmit, to a second radio access network node, a network energy saving message comprising a network energy saving indication indicative of a network energy saving mode at the first radio access network node; at block 810 receive, from the second radio access network node responsive to the network energy saving message, a network energy saving mode assistance availability indication indicative of an availability of the second radio access network node to transmit, on behalf of the first radio access network node during the network energy saving mode, minimum system information corresponding to the first radio access network node; at block 815 activate the network energy saving mode based on a configured network energy saving mode criterion being determined to be satisfied, wherein the second radio access network node transmits, to a user equipment, the minimum system information corresponding to the first radio access network node; at block 820 receive, from the user equipment, a connection establishment message according to the minimum system information corresponding to the first radio access network node; at block 825 establish a connection with the user equipment according to the minimum system information corresponding to the first radio access network node; at block 830 determine a number of user equipment initiating transition from an IDLE mode to a CONNECTED mode during a configured transition-monitoring period to result in a determined number of transitioning user equipment; and at block 835 wherein the configured network energy saving mode criterion is satisfied by the determined number of transitioning user equipment being determined to be less than a configured number of transitioning user equipment during the configured transition-monitoring period, and wherein the configured transition-monitoring period comprises a sliding time window.

Turning now to FIG. 9, the figure illustrates a non-transitory machine-readable medium 900 comprising at block 905 executable instructions that, when executed by a processor of a first radio access network node, facilitate performance of operations, comprising receiving, from a second radio access network node, a network energy saving indication, comprising minimum system information corresponding to the second radio access network node, indicative of a network energy saving mode of the second radio access network node; at block 910 responsive to the network energy saving indication, transmitting, by the first radio access network node to a user equipment on behalf of the second radio access network node, the minimum system information corresponding to the second radio access network node; at block 915 receiving, from the user equipment, a first radio resource control (RRC) connection establishment message corresponding to a provisioning beam; and at block 920 based on the first RRC connection establishment message having correspondence to the provisioning beam, transmitting, to the user equipment, a second RRC connection establishment message requesting that the user equipment initiate establishment of a connection with the second radio access network node according to the minimum system information corresponding to the second radio access network node.

Figure 10:
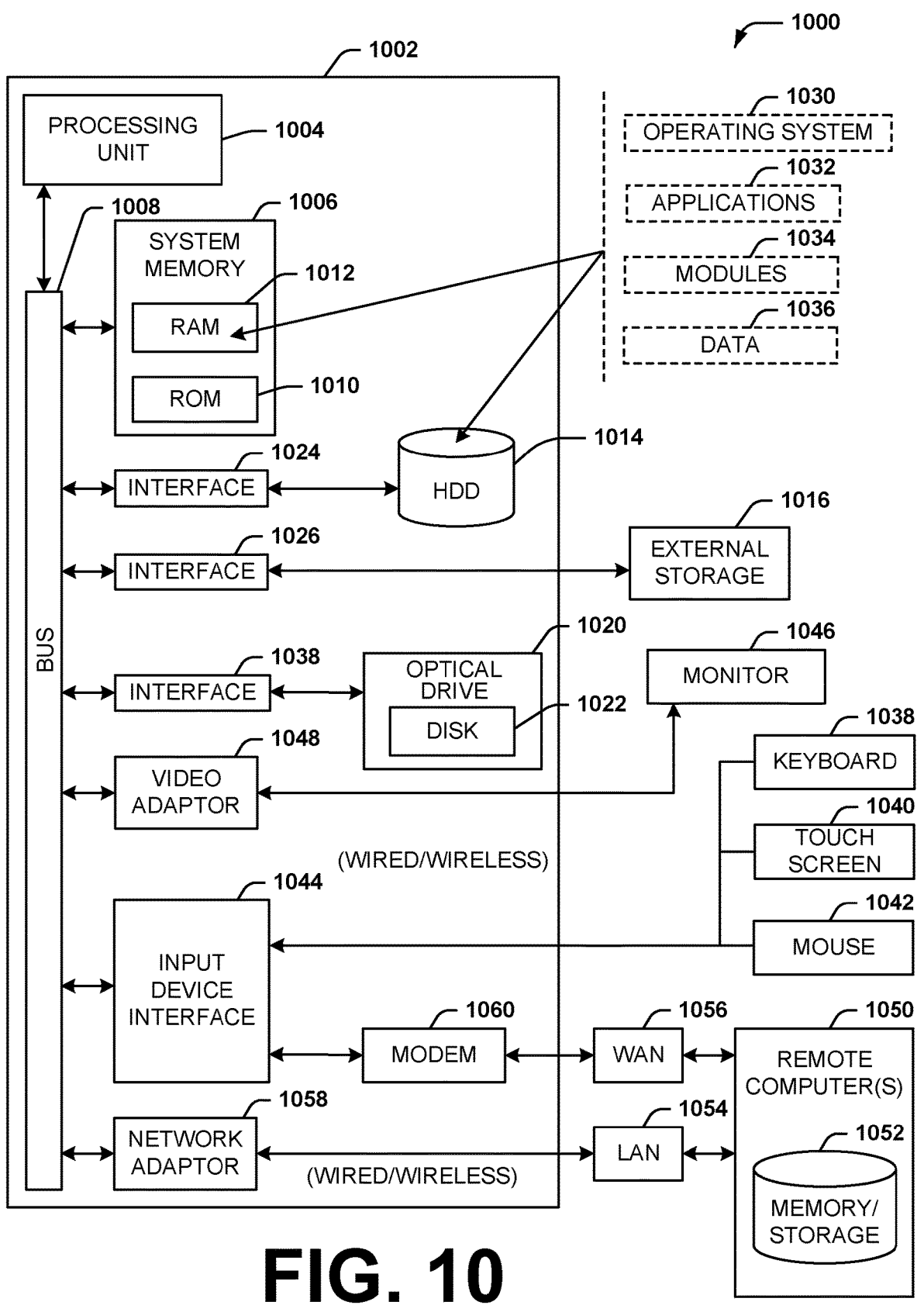
FIG. 10 illustrates an example computer environment.

In order to provide additional context for various embodiments described herein, FIG. 10 and the following discussion are intended to provide a brief, general description of a suitable computing environment 1000 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

Computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1010. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/ wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/ storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
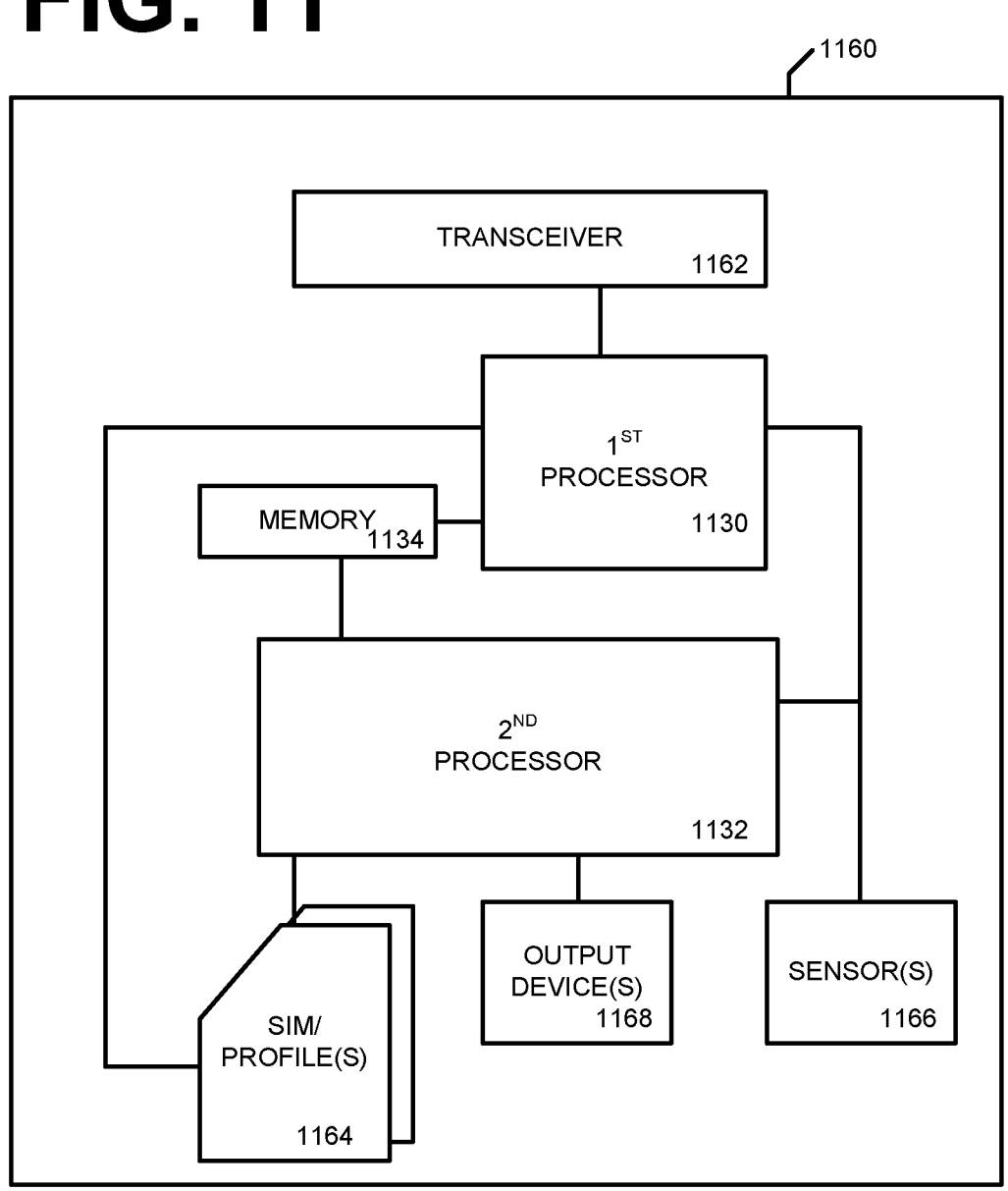
FIG. 11 illustrates a block diagram of an example wireless user equipment.

Turning now to FIG. 11, the figure illustrates a block diagram of an example UE 1160. UE 1160 may comprise a smart phone, a wireless tablet, a laptop computer with wireless capability, a wearable device, a machine device that may facilitate vehicle telematics, and the like. UE 1160 comprises a first processor 1130, a second processor 1132, and a shared memory 1134. UE 1160 includes radio front end circuitry 1162, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1162 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 11, UE 1160 may also include a SIM 1164, or a SIM profile, which may comprise information stored in a memory (memory 34 or a separate memory portion), for facilitating wireless communication with RAN 105 or core network 130 shown in FIG. 1. FIG. 11 shows SIM 1164 as a single component in the shape of a conventional SIM card, but it will be appreciated that SIM 1164 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1164 and another device, which may be a component of RAN 105 or core network 130 shown in FIG. 1). A SIM profile 1164 may also comprise identifying information that is unique to the SIM, or SIM profile, such as, for example, an International Mobile Subscriber Identity ("IMSI") or information that may make up an IMSI.

SIM 1164 is shown coupled to both the first processor portion 1130 and the second processor portion 1132. Such an implementation may provide an advantage that first processor portion 30 may not need to request or receive information or data from SIM 1164 that second processor 1132 may request, thus eliminating the use of the first processor acting as a 'go-between' when the second processor uses information from the SIM in performing its functions and in executing applications. First processor 1130, which may be a modem processor or baseband processor, is shown smaller than processor 1132, which may be a more sophisticated application processor, to visually indicate the relative levels of sophistication (i.e., processing capability and performance) and corresponding relative levels of operating power consumption levels between the two processor portions. Keeping the second processor portion 1132 asleep/inactive/ in a low power state when UE 1160 does not need it for executing applications and processing data related to an application provides an advantage of reducing power consumption when the UE only needs to use the first processor portion 1130 while in listening mode for monitoring routine configured bearer management and mobility management/ maintenance procedures, or for monitoring search spaces that the UE has been configured to monitor while the second processor portion remains inactive/asleep.

UE 1160 may also include sensors 1166, such as, for example, temperature sensors, accelerometers, gyroscopes, barometers, moisture sensors, and the like that may provide signals to the first processor 1130 or second processor 1132. Output devices 1168 may comprise, for example, one or more visual displays (e.g., computer monitors, VR appliances, and the like), acoustic transducers, such as speakers or microphones, vibration components, and the like. Output devices 1168 may comprise software that interfaces with output devices, for example, visual displays, speakers, microphones, touch sensation devices, smell or taste devices, and the like, that are external to UE 1160.

The following glossary of terms given in Table 1 may apply to one or more descriptions of embodiments disclosed herein.

TABLE 1

| Term | Definition |
|------|------------|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| BS | Base-station |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID9 |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
  receiving, by a first radio access network node comprising a processor from a second radio access network node, a network energy saving message comprising a network energy saving indication indicative of a network energy saving mode corresponding to the second radio access network node;
  responsive to the network energy saving indication, transmitting, by the first radio access network node to the second radio access network node, a network energy saving mode assistance indication indicative of the first radio access network node being able to assist the second radio access network node during the network energy saving mode;
  receiving, by the first radio access network node from a user equipment, a first connection establishment message comprising connection information corresponding to the first radio access network node; and
  facilitating, by the first radio access network node, performance of a connection operation with respect to the user equipment based on the connection information,
  wherein the network energy saving message comprises minimum system information corresponding to the second radio access network node, wherein the connection information comprises a beam index indication indicative of the user equipment having received first minimum system information corresponding to the first radio access network node via a provisioning downlink beam of the first radio access network node, and wherein the facilitating the performance of the connection operation comprises:
  facilitating, by the first radio access network node, transmitting, to the second radio access network node, a synchronization signal block request message comprising a request that the second radio access network node transmit a synchronization signal block message comprising second minimum system information corresponding to the second radio access network node; and
  facilitating, by the first radio access network node, transmitting, to the user equipment, a synchronization signal block measurement request message comprising a request that the user equipment:
    measure a signal strength of the synchronization signal block message to determine a first signal strength corresponding to the second radio access network node, and
    transmit a second connection establishment message to the second radio access network node according to the second minimum system information based on the first signal strength being determined to satisfy a signal strength criterion.

2. The method of claim 1, wherein the minimum system information corresponding to the second radio access network node comprises information that the second radio access network node transmits in a system information block 1 when the network energy saving mode is inactive at the second radio access network node.

3. The method of claim 1, wherein the provisioning downlink beam is transmitted from the first radio access network node in a direction within a configured angular range relative to the first radio access network node.

4. The method of claim 1, wherein the synchronization signal block request message comprises a request that the second radio access network node transmit the synchronization signal block message a configured number of times.

5. The method of claim 1, wherein transmitting the synchronization signal block request message to the second radio access network node comprises transmitting the synchronization signal block request message to the second radio access network node via a backhaul communication link.

6. The method of claim 1, wherein the signal strength criterion was determined by the user equipment by applying a function to a second signal strength, corresponding to the first radio access network node, measured at the user equipment.

7. The method of claim 1, wherein the connection information comprises a beam index indication indicative of the user equipment having received minimum system information corresponding to the first radio access network node via a non-provisioning downlink beam of the first radio access network node, and wherein facilitating the connection operation comprises facilitating, by the first radio access network node, establishing a connection with the user equipment.

8. The method of claim 1, wherein the second radio access network node is to activate the network energy saving mode based on a determined number of user equipment that are camped on the second radio access network node and that initiate a transition from an IDLE mode to a CONNECTED mode to result in a configured transition mode criterion being satisfied.

9. The method of claim 8, wherein the second radio access network node determines whether the configured transition mode criterion is satisfied over a time window.

10. The method of claim 1, wherein the network energy saving indication comprises at least one of: a service-inactive indication indicative of at least one signaling message to be inactive during the network energy saving mode, a duration of the network energy saving mode, or a random access and preamble configuration corresponding to the second radio access network node.

11. The method of claim 10, wherein the at least one signaling message to be inactive during the network energy saving mode comprises at least one of: a synchronization signal block message or a system information block 1 message.

12. A first radio access network node, comprising:
a processor configured to:
    transmit, to a second radio access network node, a network energy saving message comprising a network energy saving indication indicative of a network energy saving mode at the first radio access network node;
    receive, from the second radio access network node responsive to the network energy saving message, a network energy saving mode assistance availability indication indicative of an availability of the second radio access network node to transmit, on behalf of the first radio access network node during the network energy saving mode, minimum system information corresponding to the first radio access network node;
    activate the network energy saving mode based on a configured network energy saving mode criterion being determined to be satisfied, wherein the second radio access network node transmits, to a user equipment, the minimum system information corresponding to the first radio access network node;
    receive, from the second radio access network node, a synchronization signal block request message comprising a request that the first radio access network node transmit a synchronization signal block message comprising the minimum system information corresponding to the first radio access network node, wherein the user equipment receives, from the second radio access network node, a synchronization signal block measurement request message comprising a request that the user equipment:

measure a signal strength of the synchronization signal block message to determine a signal strength corresponding to the first radio access network node, and transmit a connection establishment message to the first radio access network node according to the minimum system information corresponding to the first radio access network node based on the signal strength being determined to satisfy a signal strength criterion;
receive, from the user equipment, the connection establishment message according to the minimum system information corresponding to the first radio access network node; and
establish a connection with the user equipment according to the minimum system information corresponding to the first radio access network node.

13. The first radio access network node of claim 12, wherein the processor is further configured to:
    determine a number of user equipment initiating transition from an IDLE mode to a CONNECTED mode during a configured transition-monitoring period to result in a determined number of transitioning user equipment;
    wherein the configured network energy saving mode criterion is satisfied by the determined number of transitioning user equipment being determined to be less than a configured number of transitioning user equipment during the configured transition-monitoring period, and wherein the configured transition-monitoring period comprises a sliding time window.

14. The first radio access network node of claim 12, wherein the configured network energy saving mode criterion is satisfied by the network energy saving mode assistance availability indication being indicative of the second radio access network node being available to transmit the minimum system information on behalf of the first radio access network node during the network energy saving mode.

15. The first radio access network node of claim 12, wherein the processor is further configured to determine a number of times that the first radio access network node receives synchronization signal block request messages from the second radio access network node to result in a determined number of received synchronization signal block request messages, and
    wherein the configured network energy saving mode criterion is satisfied by the determined number of received synchronization signal block request messages exceeding a configured received synchronization signal block request messages threshold.

16. A non-transitory machine-readable medium, comprising executable instructions that, when executed by a processor of a first radio access network node, facilitate performance of operations, comprising:
    receiving, from a second radio access network node, a network energy saving indication, comprising minimum system information corresponding to the second radio access network node, indicative of a network energy saving mode of the second radio access network node;
    responsive to the network energy saving indication, transmitting, by the first radio access network node to a user equipment on behalf of the second radio access network node, the minimum system information corresponding to the second radio access network node;
    transmitting, to the second radio access network node, a synchronization signal block request message comprising a request that the second radio access network node transmit a synchronization signal block message comprising minimum system information corresponding to the second radio access network node; and transmitting, to the user equipment, a synchronization signal block measurement request message comprising a request that the user equipment:

measure a signal strength of the synchronization signal block message to determine a determined signal strength corresponding to the second radio access network node, and transmit a first radio resource control (RRC) connection establishment message to the second radio access network node according to the minimum system information based on the determined signal strength being determined to satisfy a signal strength criterion.

17. The non-transitory machine-readable medium of claim 16, the operations further comprising:

receiving, from the user equipment, a second RRC connection establishment message corresponding to a provisioning beam; and based on the second RRC connection establishment message having correspondence to the provisioning beam, transmitting, to the user equipment, a second RRC connection establishment message requesting that the user equipment initiate establishment of a connection with the second radio access network node according to the minimum system information corresponding to the second radio access network node.

18. The non-transitory machine-readable medium of claim 16, the operations further comprising:

receiving, from the user equipment, a second RRC connection establishment message corresponding to a non-provisioning beam; and responsive to the second RRC connection establishment message, establishing a connection with the user equipment.

19. The first radio access network node of claim 12, wherein the minimum system information corresponding to the first radio access network node is not transmitted by the first radio access node during the network energy saving mode.

20. The non-transitory machine-readable medium of claim 16, wherein the minimum system information corresponding to the second radio access network node is not transmitted by the second radio access node during the network energy saving mode of the second radio access.

* * * * *